US012534293B2

(12) United States Patent
Giere et al.

(10) Patent No.: US 12,534,293 B2
(45) Date of Patent: Jan. 27, 2026

(54) CARRY CAN DYNAMIC STABILIZATION

(71) Applicant: Oshkosh Corporation, Oshkosh, WI (US)

(72) Inventors: David Giere, Oshkosh, WI (US); Joseph Nelson, Oshkosh, WI (US); Reid Behrens, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 348 days.

(21) Appl. No.: 18/143,188

(22) Filed: May 4, 2023

(65) Prior Publication Data

US 2023/0356936 A1 Nov. 9, 2023

Related U.S. Application Data

(60) Provisional application No. 63/339,190, filed on May 6, 2022.

(51) Int. Cl.
*B65F 3/04* (2006.01)
*B65F 3/02* (2006.01)

(52) U.S. Cl.
CPC ...... *B65F 3/041* (2013.01); *B65F 2003/0279* (2013.01)

(58) Field of Classification Search
CPC ........................................................ B65F 3/041
USPC .......................................................... 414/408
See application file for complete search history.

(56) References Cited

U.S. PATENT DOCUMENTS 2,436,723 A * 2/1948 Machin .................. A01D 87/00 414/717
2,643,011 A * 6/1953 Brisson ................... E02F 3/342 414/718
2,788,138 A * 4/1957 Stueland ............... E02F 3/6463 414/710
4,245,855 A * 1/1981 Larson .................... B66C 23/80 280/765.1
7,137,823 B2 * 11/2006 Naganishi ............ H01R 9/2466 439/949
7,553,121 B2 * 6/2009 Curotto ................... B65F 3/046 414/812
9,266,672 B2 * 2/2016 Stewart ..................... B65F 3/04
9,809,383 B2 * 11/2017 Ford ........................ B65F 3/041
9,926,134 B2 * 3/2018 Ford ........................ B65F 3/041
2017/0036628 A1 2/2017 Nelson et al.
2018/0221694 A1 8/2018 Shively et al.
(Continued)

OTHER PUBLICATIONS

Office Action issued in connection with Canada Appl. No. 3198992 dated Sep. 25, 2024.

*Primary Examiner* — Terrell H Matthews
(74) *Attorney, Agent, or Firm* — Foley & Lardner LLP

(57) ABSTRACT

A refuse vehicle includes a chassis, a body coupled to the chassis, and a lift assembly coupled to at least one of the chassis or the body and selectively repositionable between a first position and a second position. The lift assembly includes a lateral member extending between two lift arms. The refuse vehicle further includes a lateral stabilizer assembly coupled to at least one of the chassis or the body. The lateral stabilizer assembly includes a backer plate coupled to the chassis, a lateral stabilizer coupled to the backer plate, the lateral stabilizer configured to receive the lateral member when the lift assembly is moved into the first position, and an actuator configured to adjust the position of the lateral stabilizer.

19 Claims, 17 Drawing Sheets

(56) References Cited

U.S. PATENT DOCUMENTS

| | | | | |
|---|---|---|---|---|
| 2018/0221697 | A1 | 8/2018 | Shively et al. | |
| 2019/0262643 | A1 | 8/2019 | Shively et al. | |
| 2020/0102145 | A1 | 4/2020 | Nelson et al. | |
| 2020/0262328 | A1 | 8/2020 | Nelson et al. | |
| 2020/0348764 | A1 | 11/2020 | Clifton et al. | |
| 2020/0360752 | A1 | 11/2020 | Shively et al. | |
| 2021/0139237 | A1 | 5/2021 | Nelson et al. | |
| 2022/0063738 | A1 | 3/2022 | Nelson et al. | |
| 2022/0161998 | A1 | 5/2022 | Turner et al. | |
| 2022/0219896 | A1* | 7/2022 | Gary | B65F 3/08 |
| 2022/0258965 | A1 | 8/2022 | Kappers et al. | |
| 2022/0258967 | A1 | 8/2022 | Kappers et al. | |
| 2022/0324643 | A1 | 10/2022 | Giere et al. | |
| 2022/0371820 | A1 | 11/2022 | Nelson et al. | |
| 2022/0382388 | A1 | 12/2022 | Clifton et al. | |
| 2023/0024953 | A1 | 1/2023 | Shively et al. | |

* cited by examiner

CARRY CAN DYNAMIC STABILIZATION

CROSS-REFERENCE TO RELATED PATENT APPLICATIONS

The present application claims the benefit of and priority to U.S. Provisional Patent Application No. 63/339,190, filed on May 6, 2022, the entire disclosure of which is incorporated by reference herein.

BACKGROUND

The present invention relates generally to a refuse vehicle. Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY OF THE INVENTION

One embodiment relates to a refuse vehicle. The refuse vehicle includes a chassis, a body coupled to the chassis, a lift arm assembly coupled to at least one of the chassis or the body and selectively repositionable between a first position and a second position, a lateral member coupled to the lift arm assembly, a set of bump plates coupled to the fork, and a lateral stabilizer assembly coupled to at least one of the frame or the body. The lift arm assembly includes a first arm, a second arm, and an implement coupled to the first arm and the second arm. The lateral stabilizer assembly includes a lateral stabilizer and a backer plate. The lateral stabilizer is configured to support the lateral member when the lift arm assembly is in the first position. The lateral stabilizer assembly is configured to prevent lateral sway of the implement when the lift arm assembly is in the first position by the lateral stabilizer coming in contact with the set of bump plates.

At least one embodiment relates to a lateral stabilizer assembly including a lateral stabilizer, a backer plate, a spring positioned between the lateral stabilizer and the backer plate, and a down stop defined within the lateral stabilizer and configured to support a lift arm assembly. The lateral stabilizer is selectively repositionable between an extended position and a retracted position. The lateral stabilizer incudes a down stop. The backer plate includes one or more apertures and the lateral stabilizer is mounted to the backer plate. The down stop supports a lateral member when the lift arm assembly is in a transit position. The lateral stabilizer assembly is configured to prevent lateral sway of the lift arm assembly by abutting a set of bump plates positioned on the lateral member.

At least one embodiment relates to a refuse vehicle including a chassis, a body coupled to the chassis, a lift arm assembly coupled to at least one of the chassis or the body, a lateral member, a set of bump plates fixedly coupled to the lateral member, and a lateral stabilizer assembly coupled to at least one of the chassis or the body. The lift arm assembly is selectively repositionable between a transit position and a working position. The lift arm assembly includes a first arm, a second arm, and an implement coupled to the first arm and the second arm. The lateral member is positioned between the first arm and the second arm. The set of bump plates are positioned a distance away from one another. The lateral stabilizer assembly includes a lateral stabilizer, a backer plate, and a spring positioned between the lateral stabilizer and the backer plate. The lateral stabilizer is selectively repositionable between an extended position and a retracted position, and includes a down stop. The backer plate includes one or more apertures, the lateral stabilizer is mounted to the backer plate. The spring is positioned between the lateral stabilizer and the backer plate. The spring is configured to selectively reposition the lateral stabilizer between an extended position and a retracted position.

At least one embodiment relates to a lateral stabilizer assembly including a lateral stabilizer, a backer plate, an actuator positioned between the lateral stabilizer and the backer plate, and a down stop defined within the lateral stabilizer and configured to support a lift arm assembly. The lateral stabilizer is selectively repositionable between an extended position and a retracted position. The lateral stabilizer incudes a down stop. The backer plate includes one or more apertures and the lateral stabilizer is mounted to the backer plate. The down stop supports a lateral member when the lift arm assembly is in a transit position. The lateral stabilizer assembly is configured to prevent lateral sway of the lift arm assembly by abutting a set of bump plates positioned on the lateral member.

At least one embodiment relates to a refuse vehicle including a chassis, a body coupled to the chassis, a lift arm assembly coupled to at least one of the chassis or the body, a lateral member, a set of bump plates fixedly coupled to the lateral member, and a lateral stabilizer assembly coupled to at least one of the chassis or the body. The lift arm assembly is selectively repositionable between a transit position and a working position. The lift arm assembly includes a first arm, a second arm, and an implement coupled to the first arm and the second arm. The lateral member is positioned between the first arm and the second arm. The set of bump plates are positioned a distance away from one another. The lateral stabilizer assembly includes a caster assembly coupled to an end of at least one of the first arm or second arm. The caster assembly includes a mount coupled to the end of the at least one of the first arm or second arm, a hydraulic actuator coupled to the bracket and a caster. The caster engages with a ground surface when the lift arm assembly is in the working position and provides an upward force against the at least one of the first arm or second arm.

At least one embodiment relates to a refuse vehicle including a chassis, a body coupled to the chassis, a lift arm assembly coupled to at least one of the chassis or the body, a lateral member, a set of bump plates fixedly coupled to the lateral member, and a lateral stabilizer assembly coupled to at least one of the chassis or the body. The lift arm assembly is selectively repositionable between a transit position and a working position. The lift arm assembly includes a first arm, a second arm, and an implement coupled to the first arm and the second arm. The lateral member is positioned between the first arm and the second arm. The set of bump plates are positioned a distance away from one another. The lateral stabilizer assembly includes a pad assembly coupled to a front bumper of the chassis. The pad assembly includes a bracket coupled to the front bumper and a pad. The pad engages at least one of the first arm, the second arm, or the lateral member when the lift assembly is in the working position.

At least one embodiment relates to a refuse vehicle including a chassis, a body coupled to the chassis, and a lift assembly coupled to at least one of the chassis or the body and selectively repositionable between a first position and a second position. The lift assembly includes a lateral member extending between two lift arms. The refuse vehicle further includes a lateral stabilizer assembly coupled to at least one of the chassis or the body. The lateral stabilizer assembly includes a backer plate coupled to the chassis, a lateral stabilizer coupled to the backer plate, the lateral stabilizer configured to receive the lateral member when the lift assembly is moved into the first position, and an actuator configured to adjust the position of the lateral stabilizer.

At least one embodiment relates to a refuse vehicle including a chassis, a body coupled to the chassis, and a lift assembly coupled to at least one of the chassis or the body and selectively repositionable between a first position and a second position. The lift assembly includes a lateral member extending between two lift arms. The refuse vehicle further includes a lateral stabilizer assembly coupled to at least one of the chassis, the body, of the lift assembly. The lateral stabilizer assembly includes an actuator configured to adjust a position of a lateral stabilizer. The lateral stabilizer is configured to restrict lateral movement of the lateral member when the lift assembly is in the first position.

At least one embodiment relates to a lateral stabilizer assembly for a refuse container lift assembly of a refuse vehicle. The lateral stabilizer assembly includes a backing plate configured to be coupled to a front of the refuse vehicle, a lateral stabilizer rotatably coupled to the backing plate about an axis, and an actuator configured to rotate the lateral stabilizer about the axis.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle (e.g., a front end loading refuse vehicle, a refuse truck, etc.) includes a lift arm assembly (e.g., an extendable lift arm assembly, a lift arm assembly, etc.). The lift arm assembly is repositionable between a plurality of positions including a stowed position, a working position, and a transit position. The lift arm assembly further includes a lateral member disposed between a first arm and a second arm. The lateral member is configured to be selectively coupled to a lateral stabilizer assembly when the lift arm assembly is repositionable between the plurality of positions. The lateral stabilizer assembly is coupled to the front of the refuse vehicle and configured to support the lateral member when the lift arm assembly is in the transit position. The lateral stabilizer assembly further includes a lateral stabilizer configured to be selectively repositionable between an extended position and a retracted position. In some embodiments, the lateral stabilizer is defined to be a spring loaded lateral stabilizer, where a spring repositions the lateral stabilizer between the extended position and the retracted position. In other embodiments, the lateral stabilizer is defined to be a dynamically actuated stabilizer, where an actuator repositions the stabilizer between the extended position and the retracted position based on sensor measurements.

Figure 1:
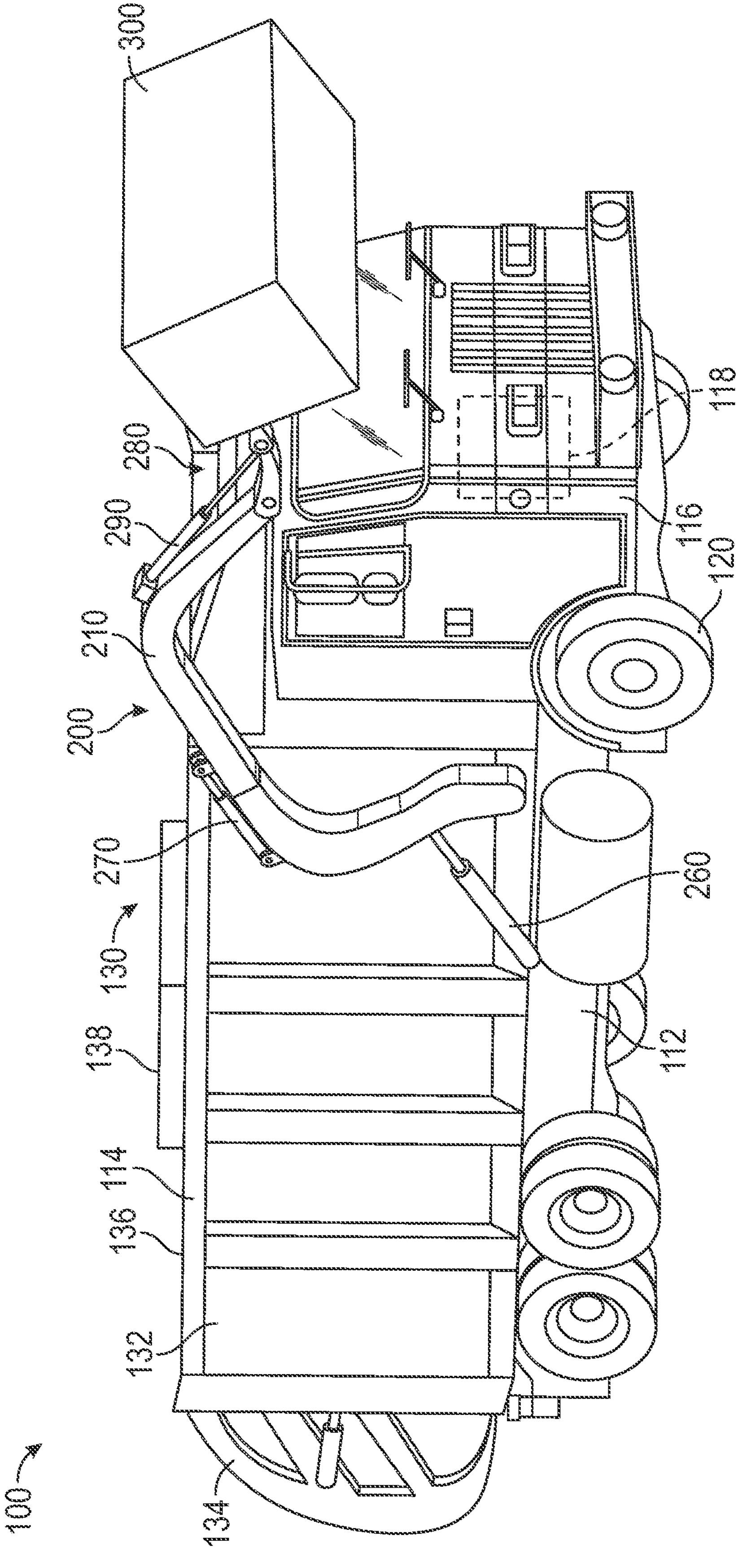
FIG. 1 is a perspective view of a refuse vehicle, according to an exemplary embodiment.

According to the exemplary embodiment shown in FIGS. 1-4, a front end loader, shown as refuse vehicle 100 (e.g., a garbage truck, a waste collection truck, a sanitation truck, etc.), is configured as a front-loading refuse truck having an extendable lift arm assembly, shown as lift arm assembly 200 (e.g., lift assembly). In other embodiments, the refuse vehicle 100 is configured as a side-loading refuse truck or a rear-loading refuse truck. In still other embodiments, the front end loader is another type of vehicle (e.g., a skid-loader, a telehandler, a plow truck, a boom lift, a construction vehicle, etc.). As shown in FIG. 1, the refuse vehicle 100 includes a chassis, shown as frame 112; a body assembly, shown as body 114, coupled to the frame 112 (e.g., at a rear end thereof, etc.); and a cab, shown as cab 116, coupled to the frame 112 (e.g., at a front end thereof, etc.). The cab 116 may include various components to facilitate operation of the refuse vehicle 100 by an operator (e.g., a seat, a steering wheel, hydraulic controls, a user interface, switches, buttons, dials, etc.). As shown in FIG. 1, the refuse vehicle 100 includes a prime mover, shown as engine 118, coupled to the frame 112 at a position beneath the cab 116. The engine 118 is configured to provide power to a plurality of tractive elements, shown as wheel and tire assemblies 120 (e.g., wheels), and/or to other systems of the refuse vehicle 100

(e.g., a pneumatic system, a hydraulic system, etc.). In other embodiments, the tractive elements include track elements. The engine 118 may be configured to utilize one or more of a variety of fuels (e.g., gasoline, diesel, bio-diesel, ethanol, natural gas, etc.), according to various exemplary embodiments. According to an alternative embodiment, the engine 118 additionally or alternatively includes one or more electric motors coupled to the frame 112 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine driven generator, etc.), and/or from an external power source (e.g., overhead power lines, a charger, etc.) and provide power to the systems of the refuse vehicle 100.

According to an exemplary embodiment, the refuse vehicle 100 is configured to transport refuse from various waste receptacles within a municipality to a storage and/or processing facility (e.g., a landfill, an incineration facility, a recycling facility, etc.). As shown in FIG. 1, the body 114 includes a plurality of panels, shown as panels 132, a tailgate 134, and a cover 136. The panels 132, the tailgate 134, and the cover 136 define a collection chamber (e.g., hopper, etc.), shown as refuse compartment 130. Loose refuse may be placed into the refuse container 300 where it may thereafter be compacted. The refuse compartment 130 may provide temporary storage for refuse during transport to a waste disposal site and/or a recycling facility. In some embodiments, at least a portion of the body 114 and the refuse compartment 130 extend in front of and/or above the cab 116. According to the embodiment shown in FIG. 1, the body 114 and the refuse compartment 130 are positioned behind the cab 116. In some embodiments, the refuse compartment 130 includes a hopper volume and a storage volume. Refuse may be initially loaded into the hopper volume and thereafter compacted into the storage volume. According to an exemplary embodiment, the hopper volume is positioned between the storage volume and the cab 116 (i.e., refuse is loaded into a position of the refuse compartment 130 behind the cab 116 and stored in a position further toward the rear of the refuse compartment 130). In other embodiments, the storage volume is positioned between the hopper volume and the cab 116 (e.g., a rear-loading refuse vehicle, etc.).

As shown in FIGS. 1-4, the lift arm assembly 200 includes a first lift arm, shown as right lift arm 210, coupled to a first side of the body 114 and/or the frame 112, and a second lift arm, shown as left lift arm 212, coupled to an opposing second side of the body 114 and/or the frame 112 such that the right lift arm 210 and the left lift arm 212 extend forward of the cab 116 (e.g., a front-loading refuse vehicle, etc.). In other embodiments, the lift arm assembly 200 extends rearward of the body 114 (e.g., a rear-loading refuse vehicle, etc.). In still other embodiments, the lift arm assembly 200 extends from a side of the body 114 (e.g., a side-loading refuse vehicle, etc.). It should be noted that the description of the left lift arm 212 provided herein with regards to FIGS. 2-4 similarly applies to the right lift arm 210.

Figure 2:
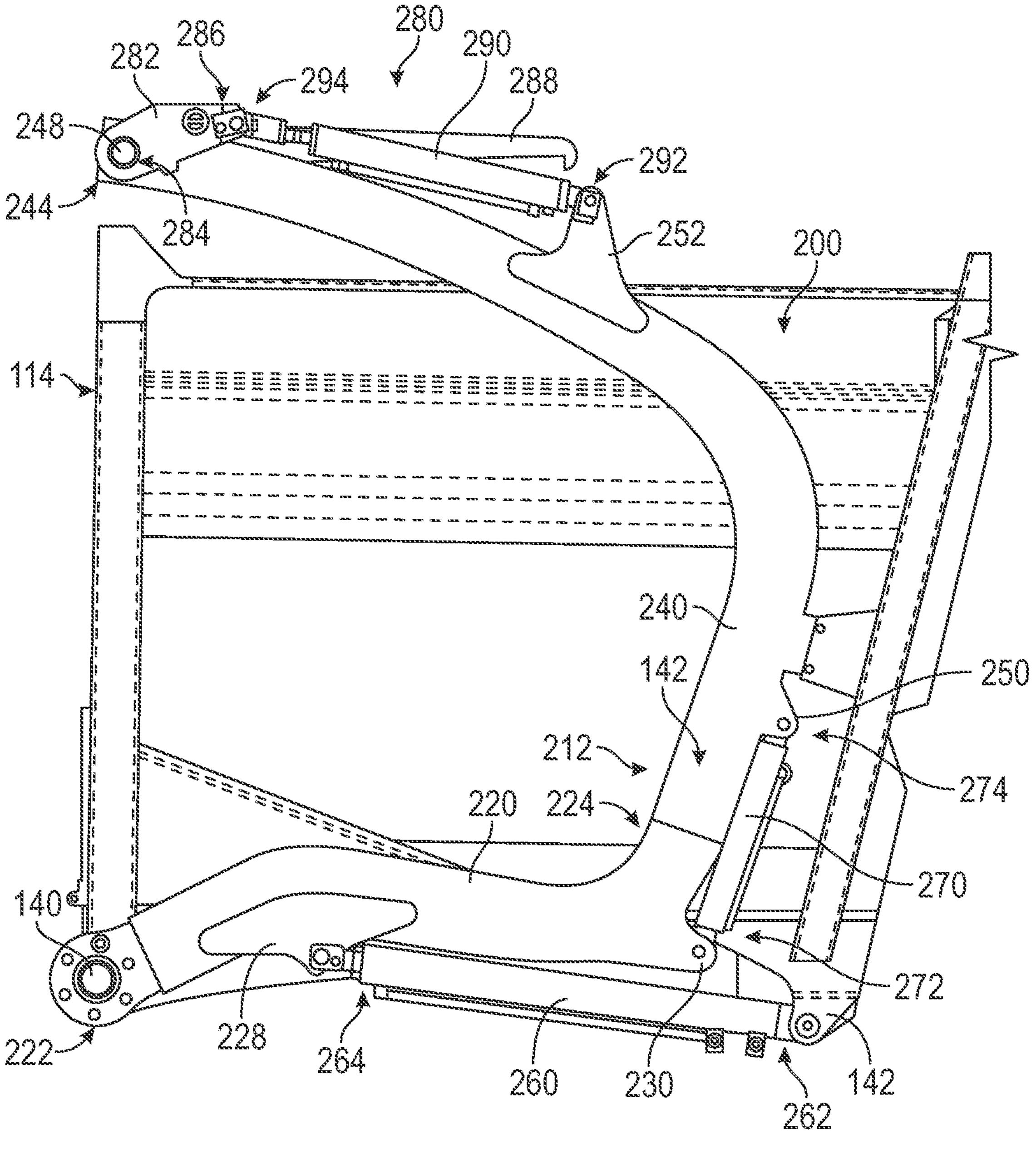
FIG. 2 is a side view of a lift arm assembly in a stowed position, according to an exemplary embodiment.
Figure 3:
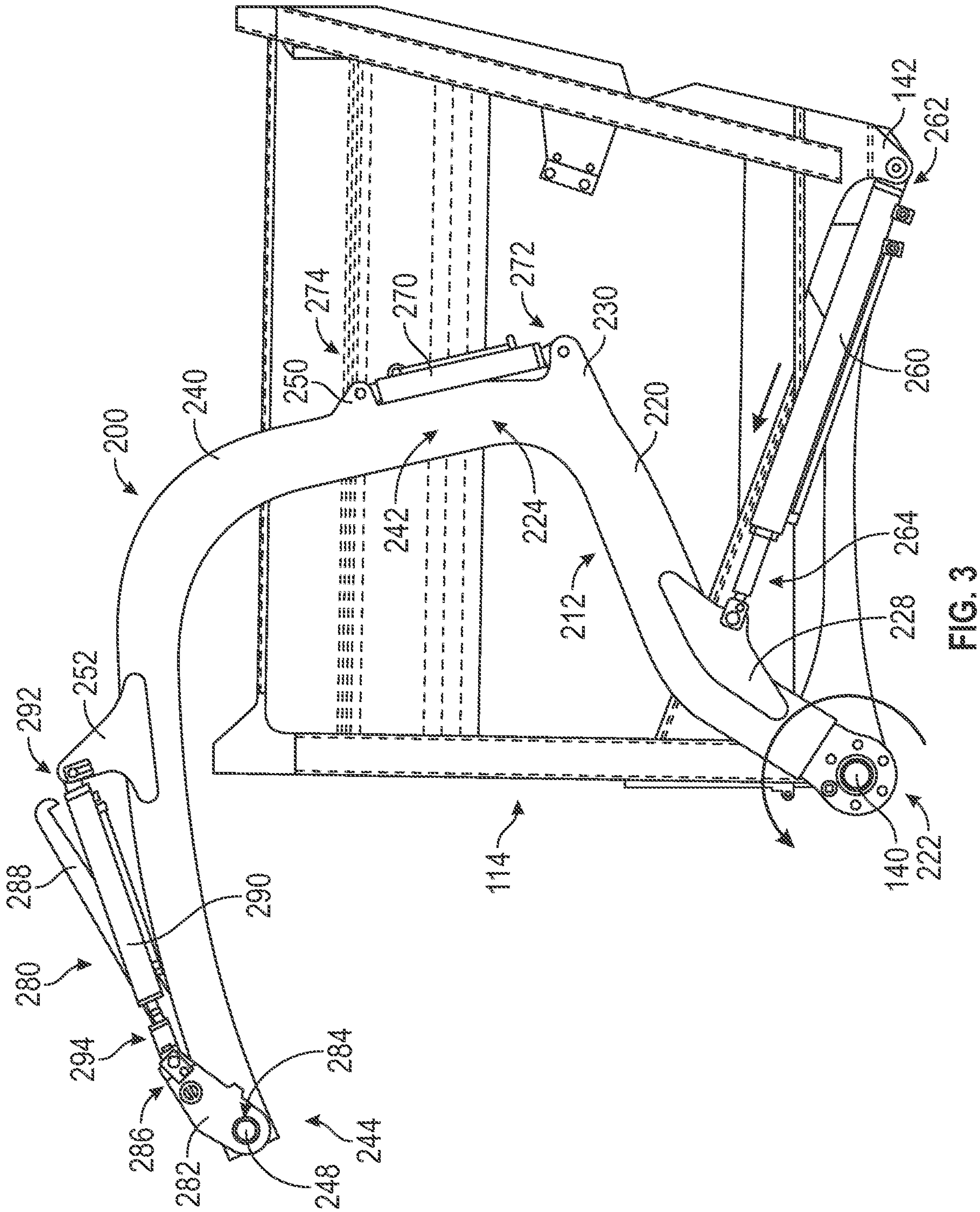
FIG. 3 is a side view of the lift arm assembly of FIG. 2 in an intermediate position, according to an exemplary embodiment.
Figure 4:
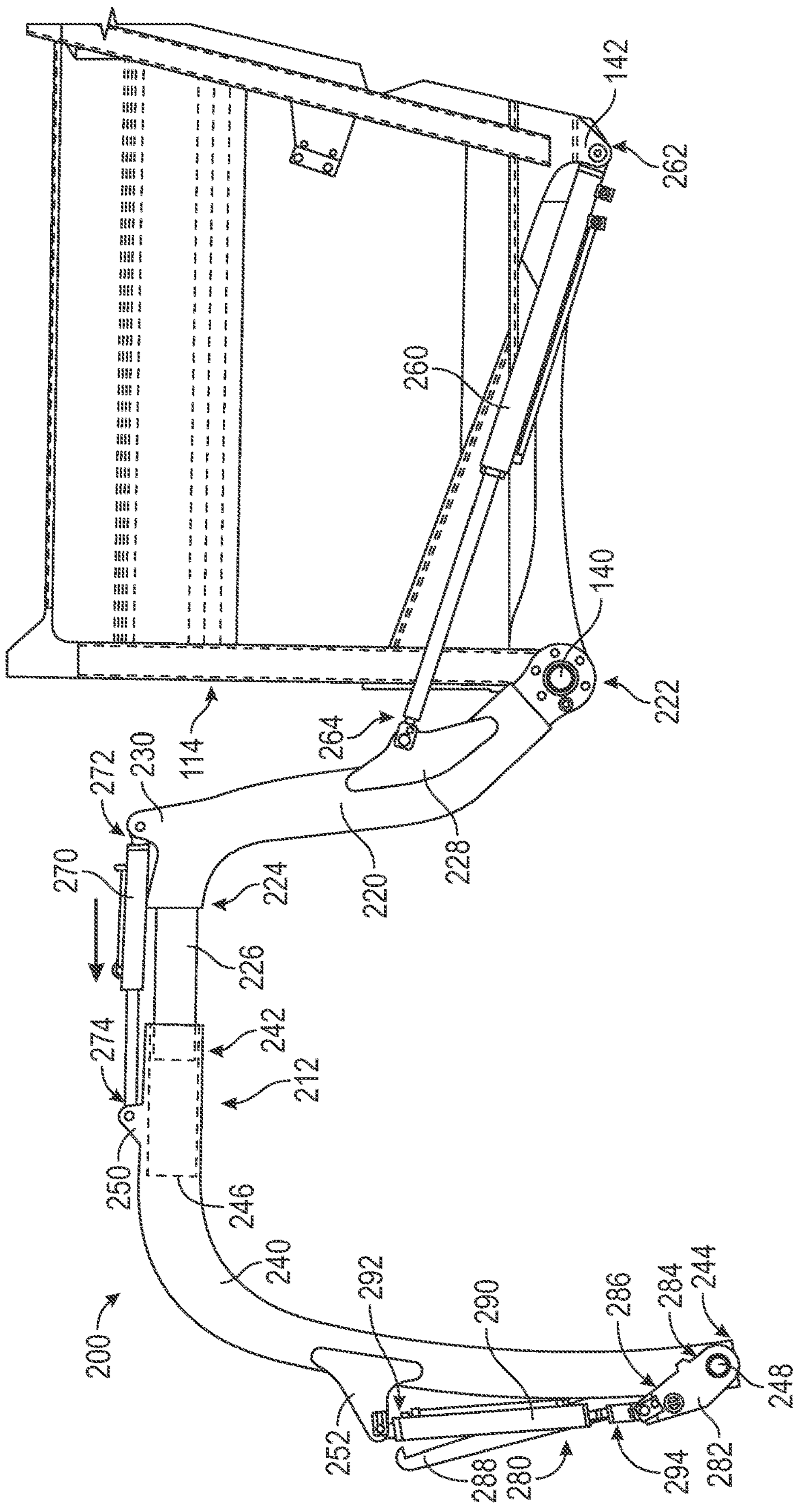
FIG. 4 is a side view of the lift arm assembly of FIG. 2 in a working position, according to an exemplary embodiment.

As shown in FIGS. 2-4, the left lift arm 212 (and similarly the right lift arm 210) has a plurality of arm portions including at least a first arm portion, shown as first arm portion 220, and a second arm portion, shown as second arm portion 240. In some embodiments, the plurality of arm portions includes three or more arm portions (e.g., that are extendable, pivotable, or otherwise repositionable relative to each other at multiple locations/joints therealong, etc.). The first arm portion 220 has a first end, shown as first end 222, pivotally coupled to a side (e.g., the left side, the right side, etc.) of the body 114 and/or the frame 112 at a first pivot point, shown as lift arm pivot 140, and an opposing second end, shown as second end 224. As show in FIG. 4, the second end 224 has a protrusion, shown as projection 226, extending therefrom. As shown in FIGS. 2-4, the first arm portion 220 includes (i) a first coupler, shown as first bracket 228, coupled along the first arm portion 220 between the first end 222 and the second end 224 (e.g., closer to the first end 222, proximate the first end 222, etc.), and (ii) a second coupler, shown as first flange 230, extending from the first arm portion 220, proximate the second end 224.

As shown in FIGS. 2-4, the second arm portion 240 has a first end, shown as first end 242, and an opposing second end, shown as second end 244 (e.g., lower end). As show in FIG. 4, the first end 242 defines a cavity, shown as extension cavity 246, positioned to slidably receive the projection 226 of the first arm portion 220 (e.g., forming a telescoping assembly, etc.). In other embodiments, the second end 224 of the first arm portion 220 defines the extension cavity 246 and the first end 242 of the second arm portion 240 has the projection 226. As shown in FIGS. 2-4, the second arm portion 240 includes (i) a third coupler, shown as second flange 250, extending from the second arm portion 240, proximate the first end 242, and (ii) a fourth coupler, shown as second bracket 252, coupled along the second arm portion 240 between the first end 242 and the second end 244.

In an alternative embodiment, the left lift arm 212 and the right lift arm 210 do not include the projection 226 or the extension cavity 246. In such an embodiment, the first arm portion 220 and the second arm portion 240 may be stacked (e.g., in a side-by-side arrangement, in a top-and-bottom arrangement, etc.) where the first end 242 of the second arm portion 240 over-retracts beyond the second end 224 of the first arm portion 220 and slides or translates therealong. The first arm portion 220 and the second arm portion 240 may be coupled together using a sliding or track mechanism (e.g., a slide assembly, a track assembly, etc.). In some embodiments, the second end 224 of the first arm portion 220 is positioned on the inside of the second arm portion 240. In some embodiments, the second end 224 of the first arm portion 220 is positioned on the outside of the first end 242 of the second arm portion 240. In some embodiments, the second end 224 of the first arm portion 220 is positioned on top of the first end 242 of the second arm portion 240. In some embodiments, the second end 224 of the first arm portion 220 is positioned below the first end 242 of the second arm portion 240.

As shown in FIGS. 1-4, the lift arm assembly 200 includes a pair of first actuators (e.g., hydraulic cylinders, pneumatic actuators, electric actuators, etc.), shown as pivot actuators 260, a pair of second actuators (e.g., hydraulic cylinders, pneumatic actuators, electric actuators, etc.), shown as extension actuators 270, an implement, shown as fork assembly 280, and a pair of third actuators (e.g., hydraulic cylinders, pneumatic actuators, electric actuators, etc.), shown as implement actuators 290. As shown in FIGS. 2-4, each of the pivot actuators 260 includes a first end, shown as first end 262, pivotally coupled to a side of the body 114 and/or the frame 112 at a second pivot point, shown as pivot actuator pivot 142, and an opposing second end, shown as second end 264, coupled to the first bracket 228 of the first arm portion 220. According to an exemplary embodiment, the pivot actuators 260 are positioned such that extension and retraction thereof pivots the right lift arm 210 and the left lift arm 212 about the lift arm pivot 140 between (i) a stowed or dumping position, as shown in FIG. 2, (ii) a working position, as shown in FIG. 4, and (iii) a transit position, as shown in FIG. 3. According to an exemplary embodiment, the transit position is a position between the stowed position and the working position that (i) provides greater operator visibility in front of the refuse vehicle 100 from the cab 116 relative to the working position and (ii) provides increased over-height clearance relative to the stowed position.

As shown in FIGS. 2-4, each of the extension actuators 270 includes a first end, shown as first end 272, coupled to the first flange 230 of the first arm portion 220, and an opposing second end, shown as second end 274, coupled to the second flange 250 of the second arm portion 240. In another embodiment, one or both of the extension actuators 270 include a rotatory actuator (e.g., an electric stepper motor, a hydraulic motor, etc.) and a translator. The translator may be a rack (e.g., such that the extension actuators 270 is a rack and pinion device, etc.), a cable, a chain, a bar, etc. According to the exemplary embodiment shown in FIGS. 1-4, the extension actuators 270 are positioned externally relative to the right lift arm 210 and the left lift arm 212 and extend between the second end 224 of the first arm portion 220 and the first end 242 of the second arm portion 240. In other embodiments, the extension actuators 270 are positioned internally within the right lift arm 210 and the left lift arm 212 and extend between the second end 224 of the first arm portion 220 and the first end 242 of the second arm portion 240. According to an exemplary embodiment, the extension actuators 270 are positioned such that extension and retraction thereof repositions (e.g., extends, retracts, etc.) the second arm portion 240 relative to the first arm portion 220 between a retracted position, as shown in FIGS. 2 and 3, and an extended position, as shown in FIG. 4. According to an exemplary embodiment, retracting the extension actuators 270 provides increased clearance when the lift arm assembly 200 is in the stowed position and increased reach when the lift arm assembly 200 is in the working position.

In some embodiments, the extension actuators 270 are configured to extend (e.g., automatically, etc.) in response to the pivot actuators 260 pivoting the right lift arm 210 and the left lift arm 212. By way of example, the extension actuators 270 may be configured to automatically extend based on a position of the lift arm assembly 200 relative to the cab 116 and/or the frame 112. For example, the extension actuators 270 may be configured to automatically extend as the fork assembly 280 reaches a position where the fork assembly 280 becomes close to the cab 116 (e.g., an upper trailing edge thereof, an upper leading edge thereof, etc.) as the lift arm assembly 200 is pivoted between the stowed position and the working position (e.g., to prevent the fork assembly 280 from hitting the cab 116, etc.). The extension actuators 270 may thereafter be configured to automatically retract after the cab 116 (e.g., the upper trailing edge thereof, the upper leading edge thereof, etc.) is cleared to reduce the overall envelope of the refuse vehicle 100. Accordingly, the lift arm assembly 200 facilitates using smaller lift arms on vehicles with large cabs without an issue (i.e., due to the extendibility provided by the lift arm assembly 200).

As shown in FIGS. 2-4, the fork assembly 280 includes a pair of pivotal couplers, shown as fork brackets 282, and a pair of forks, shown as forks 288, coupled to the fork brackets 282. According to an exemplary embodiment, one of the fork brackets 282 is coupled to a respective one of the right lift arm 210 and the left lift arm 212. The forks 288 are rotationally fixed with the fork brackets 282 (e.g., pivotal movement of the fork brackets 282 causes the forks 288 to pivot therewith, etc.), according to an exemplary embodiment.

As shown in FIGS. 2-4, each of the fork brackets 282 includes (i) a first coupling point, shown as first coupling point 284, pivotally coupled to the second end 244 of the second arm portion 240 at a third pivot point, shown as fork assembly pivot 248, and (ii) a second coupling point, shown as second coupling point 286. Each of the implement actuators 290 includes a first end, shown as first end 292, coupled to the second bracket 252 of the second arm portion 240 and an opposing second end, shown as second end 294, coupled to the second coupling point 286 of the fork brackets 282. According to an exemplary embodiment, the implement actuators 290 are positioned such that extension and retraction thereof pivots the fork brackets 282 and thereby the forks 288 about the fork assembly pivot 248 between a stowed position, as shown in FIGS. 2-4, and a working position, as shown in FIG. 1. In other embodiments, the fork assembly 280 is replaced or replaceable with a plow attachment.

As shown in FIG. 1, the lift arm assembly 200 is configured to engage with a container, shown as refuse container 300. By way of example, the refuse vehicle 100 may be driven up to a refuse pick-up location. The pivot actuators 260 may then be engaged to pivot the right lift arm 210 and the left lift arm 212 from the stowed position to the working position, as well as the implement actuators 290 may be engaged to pivot the forks 288 from the stowed position to the working position. The refuse container 300 may thereafter be retrieved from its storage location and brought proximate the lift arm assembly 200 or the refuse vehicle 100 may be driven up to the refuse container 300 such that the forks 288 align with fork tubes on the refuse container 300. A traditional refuse vehicle includes non-extendable lift arms and, therefore, in order to bring forks of the non-extending lift arms into engagement with fork tubes of a refuse container, the refuse vehicle has to be driven forward such that the forks are received by the fork tubes. The extendibility of the lift arm assembly 200 eliminates such a need to drive the refuse vehicle 100 forward to bring the forks 288 into engagement with the fork tubes of the refuse container 300. For example, once the fork tubes of the refuse container 300 are in alignment with the forks 288, the extension actuators 270 may be extended such that the second arm portion 240 extend from the first arm portion 220, bringing the forks 288 into engagement with the fork tubes of the refuse container 300. Engaging the forks 288 with the extension actuators 270 rather than by driving the refuse vehicle 100 forward may provide increased control, provide the ability to access refuse container 300 in tighter spaces, and/or provide still other advantages.

The pivot actuators 260 may thereafter be engaged to lift the refuse container 300 over the cab 116. According to an exemplary embodiment, the implement actuators 190 are positioned to articulate the forks 288, where such articulation may assist in tipping refuse out of the refuse container 300 and into the hopper volume of the refuse compartment 130 through an opening in the cover 136. According to an exemplary embodiment, a door, shown as top door 138, is movably coupled along the cover 136 to seal the opening, thereby preventing refuse from escaping the refuse compartment 130 (e.g., due to wind, bumps in the road, etc.). The pivot actuators 260 may thereafter be engaged to pivot the right lift arm 210 and the left lift arm 212 to return the empty refuse container 300 to the ground. The extension actuators 270 may then be engaged to retract the forks 288 from the fork tubes of the refuse container 300 (e.g., without having to drive the refuse vehicle 100 in reverse, etc.).

Figure 5:
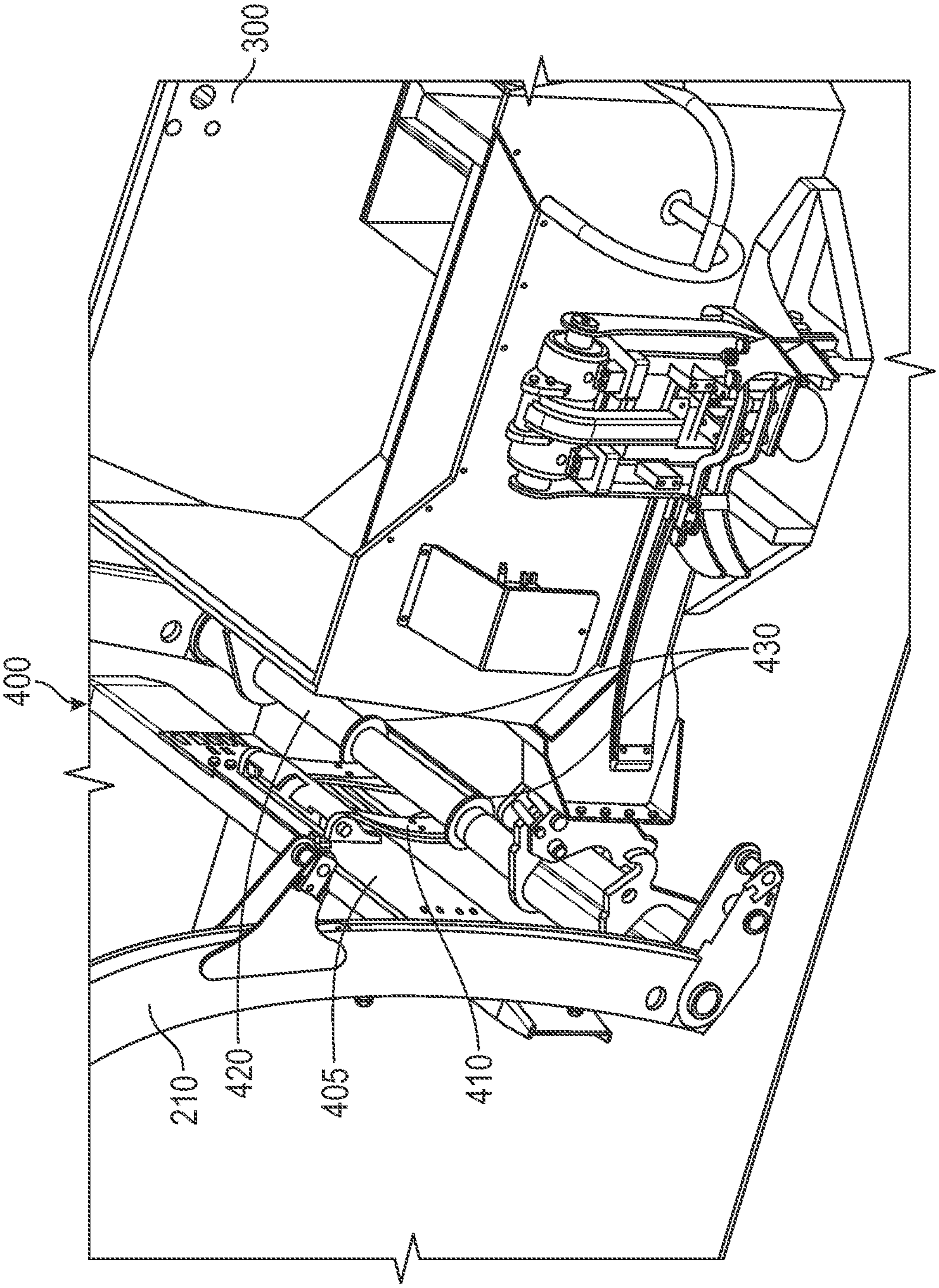
FIG. 5 is a side view of a lateral stabilizer assembly in a stowed position, according to an exemplary embodiment.
Figure 6:
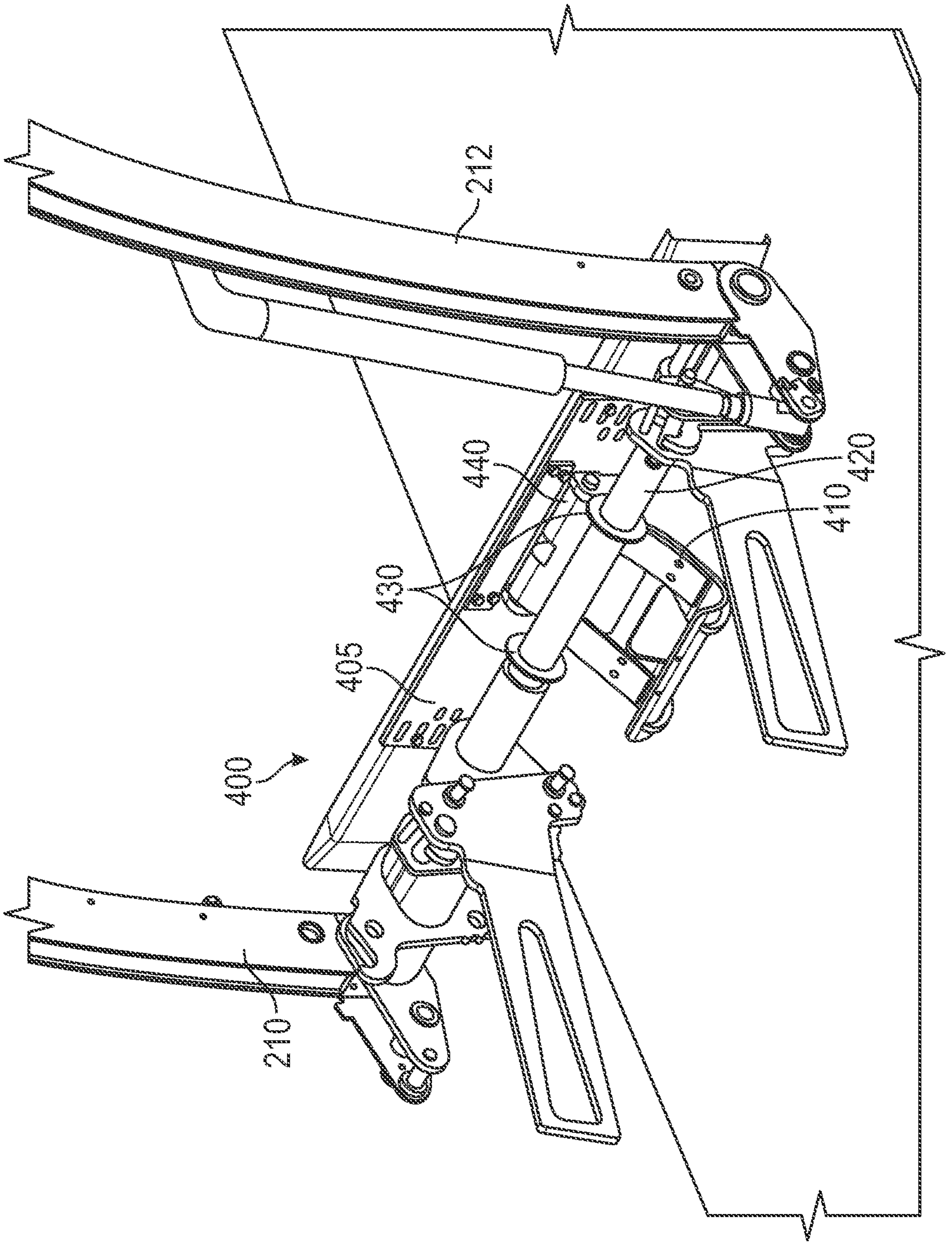
FIG. 6 is a side view of a lateral stabilizer assembly of FIG. 5 in an intermediate position, according to an exemplary embodiment.
Figure 7:
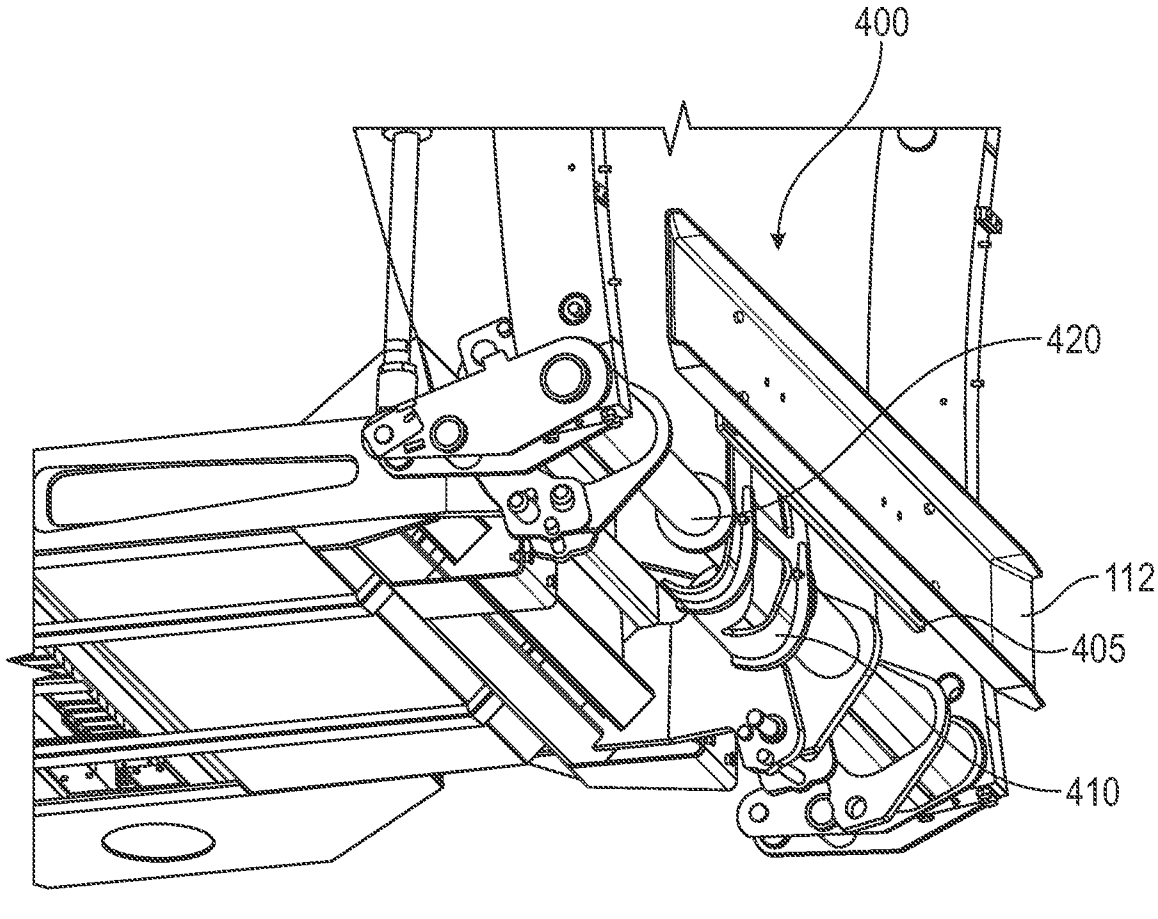
FIG. 7 is a rear, perspective view of a lateral stabilizer assembly of FIG. 5 in a stowed position, according to an exemplary embodiment.

Referring now to FIGS. 5-7, a detailed portion of the refuse vehicle 100 of FIG. 1 is shown. The refuse vehicle 100 comprises a lateral stabilizer assembly 400 fixedly coupled to the front of the refuse vehicle 100. The lateral stabilizer assembly 400 is fixedly coupled to the front of the refuse vehicle 100 by a backer plate 405. The backer plate 405 is disposed along at least a portion of the front bumper of the refuse vehicle 100. In some embodiments, the lateral stabilizer assembly 400 may be coupled to the rear of the refuse vehicle 100. The lateral stabilizer assembly 400 is defined between the right lift arm 210 and the left lift arm 212. In some embodiments, the lateral stabilizer assembly 400 is defined outside of the right lift arm 210 and the left lift arm 212. The lateral stabilizer assembly 400 is positioned at the midpoint of the refuse vehicle 100 (e.g., positioned halfway between the right lift arm 210 and the left lift arm 212). In some embodiments, the lateral stabilizer assembly 400 is not positioned at the midpoint of the refuse vehicle 100. In some embodiments, the right lift arm 210 and the left lift arm 212 feature casters on a distal end. The casters may be hydraulically powered and provide stabilization for the right lift arm 210 and the left lift arm 212 when the lift assembly is lowered, such that the casters engage a ground surface.

The lateral stabilizer assembly 400 is configured to prevent or prohibit horizontal sway in the refuse container 300. In some embodiments, the lateral stabilizer assembly 400 may prohibit vertical sway in the refuse container 300. In still some embodiments, the lateral stabilizer assembly 400 may prohibit both horizontal and vertical sway in the refuse container 300. The lateral stabilizer assembly 400 comprises a lateral stabilizer 410 coupled to both the lateral stabilizer assembly 400 and a lateral member 420. The lateral stabilizer 410 is configured to be selectively coupled to the lateral member 420, where the lateral stabilizer 410 can be engaged and disengaged by positioning the lift arm assembly between the working position and the transit position. In some embodiments, the lateral stabilizer 410 may be selectively engaged and disengaged by a controlled device configured to actuate the lateral stabilizer 410 in various configurations (e.g., motor, user input, etc.). In some embodiments, the container assembly features casters underneath the refuse container 300. The casters may be hydraulically powered to support the refuse container 300.

The lift arm assembly 200 is selectively repositionable between the working position and the transit position. When the lift arm assembly 200 is in the working position, the lateral member 420 disengages from the lateral stabilizer 410. In this position, the refuse container 300 is subject to horizontal sway. When the lift arm assembly 200 is in the transit position, the lateral member 420 engages the lateral stabilizer 410. In this position, the lateral stabilizer 410 interfaces with a set of stops, shown as bump plates 430, disposed on either end of the lateral member 420. The bump plates 430 are fixedly coupled to the lateral member 420 on either end where the lateral stabilizer 410 is selectively coupled. The bump plates 430 are configured to prevent the lateral member 420 from translating in the horizontal direction. In some embodiments, the bump plates 430 are defined along the circumference of the lateral member 420. In still some embodiments, the bump plates are defined along a portion of the lateral member 420. The bump plates 430 are further defined to be a set of bump plates, where one bump plate is positioned on each end of the lateral member 420. In some embodiments, there may be multiple sets of bump plates 430 positioned along the lateral member 420.

Referring to FIG. 6, an orthogonal view of the lift arm assembly 200 of FIG. 1 is shown. The lateral stabilizer 410 includes a spring 440 positioned between each end of the lateral stabilizer 410. The spring 440 is coupled to both the lateral stabilizer 410 and the backer plate 405. The spring 440 is configured to position the lateral stabilizer 410 in an extended position, where the lateral stabilizer 410 is distal to the backer plate 405. When the lift arm assembly 200 is lowered into the transit position, the lateral member 420 engages the lateral stabilizer 410 in a retracted position, where the lateral stabilizer 410 is proximal to the backer plate 405. When the lift arm assembly 200 is raised such that the lateral member 420 disengages from the lateral stabilizer 410, the spring 440 positions the lateral stabilizer 410 back into the extended position. In some embodiments, the lateral stabilizer 410 is in a fixed position, proximal to the backer plate 405. Thus, the spring 440 will not selectively reposition the lateral stabilizer 410 when engaging or disengaging the lift arm assembly 200. The lateral stabilizer 410 is further defined to be a spring loaded lateral stabilizer, where the spring 440 is defined to be the prime mover positioning the lateral stabilizer 410 between the extended position and the retracted position. In some embodiments, the spring 440 is replaced with a rotational actuator configured to rotate the lift stabilizer 410.

The lateral stabilizer 410 is configured to rotate (e.g., pivot) along an axis, shown as rotational axis 445. The rotational axis 445 extends along the length of the spring in a X-X direction. In some embodiments, the rotational axis 445 is not disposed along the X-X direction. The rotational axis 445 is further defined to be parallel to the top edge of the backer plate 405 and perpendicular at least one side edge of the backer plate 405. In some embodiments, the rotational axis 445 may not be parallel to the top edge of the backer plate 405. In some embodiments, the rotational axis 445 may not be perpendicular to at least one side edge of the backer plate 405. In some embodiments, the rotational axis 445 may not be parallel to the top edge of the backer plate 405 or perpendicular to at least one of the side edges of the backer plate 405.

Referring to FIG. 7, a rear, perspective view of the lateral stabilizer assembly 400 of FIG. 5 is shown. The lift arm assembly 200 is shown in an intermediate position (e.g., the lift arm assembly 200 is not in the working position or the transit position). In such an embodiment, the lateral stabilizer 410 is also in an intermediate position, where the lateral stabilizer 410 is in neither the extended nor retracted position. The lateral member 420 is configured to be in contact with the top of the lateral stabilizer 410. This orientation is configured to be a guide for the retracted position and the extended position. Lowering the lift arm assembly 200 will completely position the lateral member 420 within the lateral stabilizer 410. Raising the lift arm assembly 200 will completely position the lateral member 420 away from the lateral stabilizer 410 (e.g., the lateral member 420 will no longer be in contact with the lateral stabilizer 410). In some embodiments, the lateral member 420 will not be in contact with the lateral stabilizer 410 when the lift arm assembly 200 is in the intermediate position.

Figure 8:
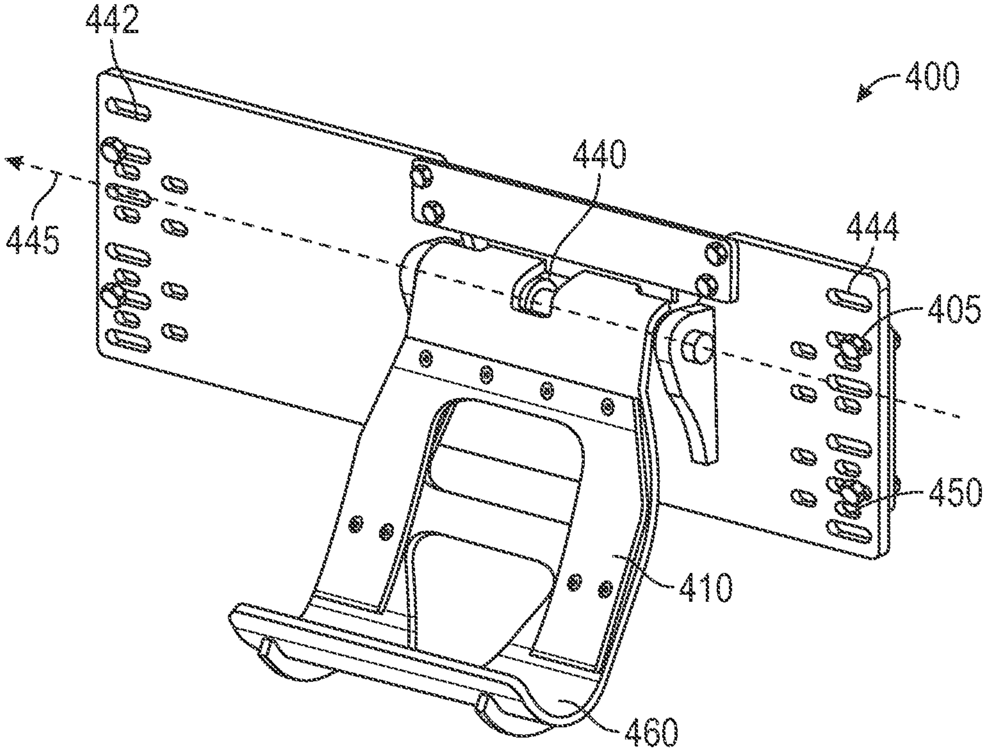
FIG. 8 is a perspective view of a lateral stabilizer, according to an exemplary embodiment.

Referring now to FIG. 8, an orthogonal view of the lateral stabilizer assembly 400 of FIG. 5 is shown. The backer plate 405 further includes a first backer plate end 442 positioned proximal to the right lift arm 210 and a second backer plate end 444 positioned proximal to the left lift arm 212. In some embodiments, the first backer plate end 442 and the second backer plate end 444 are both positioned proximal to the right lift arm 210. In still some embodiments, the first backer plate end 442 and the second backer plate end 444 are both positioned proximal to the left lift arm 212. The lateral stabilizer 410 is coupled to the front of the refuse vehicle 100 through the mounting interfaces 450. The mounting interfaces 450 may include slots or holes configured to accept a bolt therebetween and are defined within the body of the backer plate 405. In some embodiments, the mounting interfaces 450 may include additional mounting features (e.g., hooks, latches, etc.). The mounting interfaces 450 are defined to be positioned at both the first backer plate end 442 and the second backer plate end 444. In some embodiments, the mounting interfaces 450 are only positioned at one of the first backer plate end 442 and the second backer plate end 444. The lateral stabilizer assembly 400 may include a plurality of mounting interfaces 450 configured to fixedly couple the backer plate 405 to the refuse vehicle 100. In some embodiments, the lateral stabilizer assembly 400 may only include one mounting interface 450. The lateral stabilizer 410 further includes a concave down stop 460 positioned at the bottom of the lateral stabilizer 410. The down stop 460 is configured to provide support to the lateral member 420, when the lift arm assembly 200 is in the transit position (e.g., lowered). The down stop 460 is further defined to have a radius. The radius of the down stop 460 is configured to be larger than the radius of the lateral member 420 such that at least a portion of the lateral member 420 is selectively coupled to a portion of the lateral stabilizer 410. In some embodiments, the down stop 460 may be defined to have a rectangular portion, where the lateral member 420 is configured to rest thereon.

Figure 9:
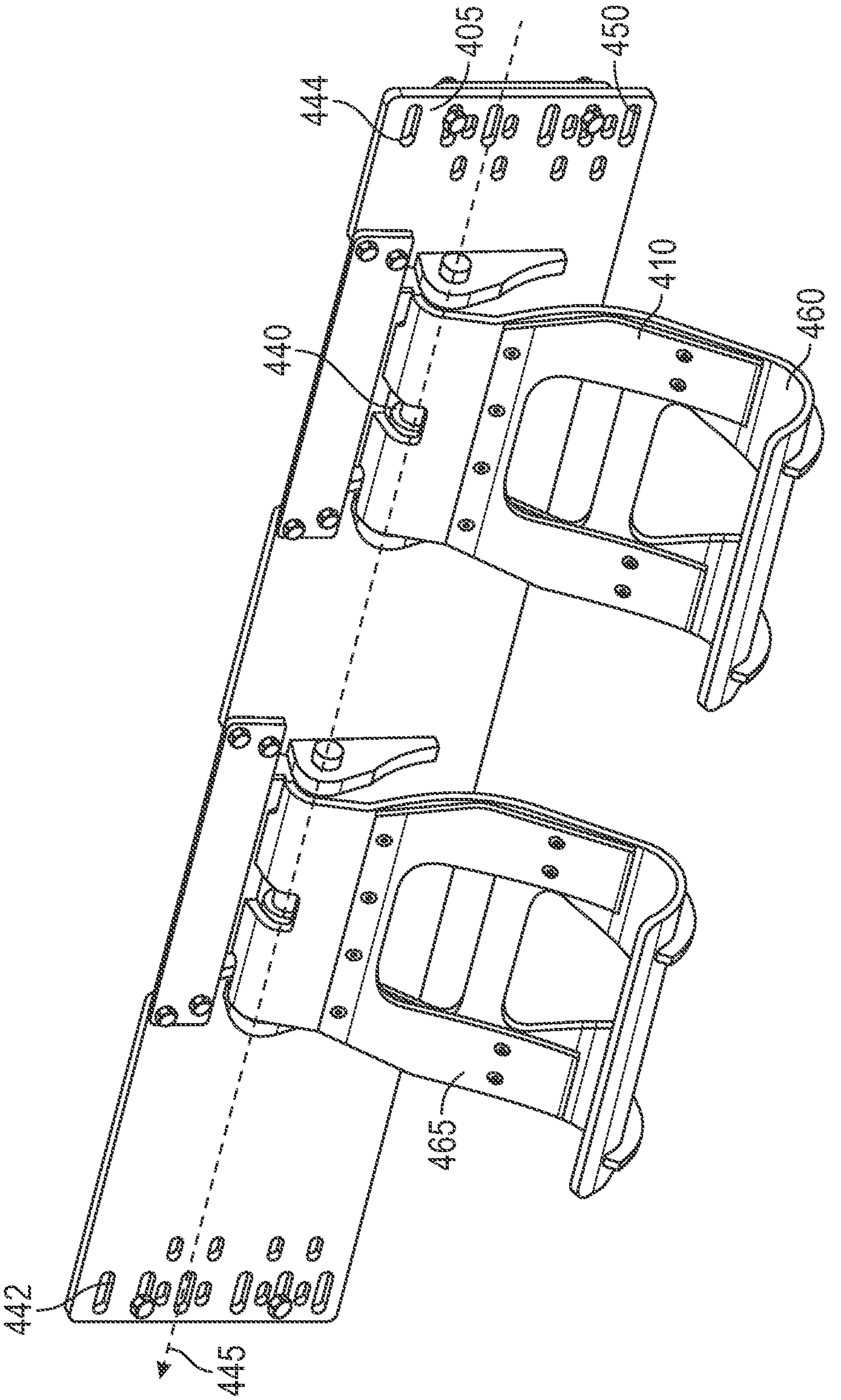
FIG. 9 is a perspective view of a lateral stabilizer, according to an exemplary embodiment.

Referring to FIG. 9, the lateral stabilizer assembly 400 of FIG. 5 is shown, according to an example embodiment. As shown, the lateral stabilizer assembly 400 may include a second lateral stabilizer 465, positioned below and along the length of the lateral member 420. The second lateral stabilizer 465 is defined to be similar to the lateral stabilizer 410. The second lateral stabilizer 465 may be selectively repositionable between the extended position and the retracted position, such that lift arm assembly 200 is not able to horizontally sway when the second lateral stabilizer 465 is in the retracted position. In the retracted position, the second lateral stabilizer 465 is selectively coupled to the lateral member 420. The second lateral stabilizer 465 is defined to have a radius such that the lateral member 420 may rest within the second lateral stabilizer 465 when the lift arm assembly 200 is in the transit position.

In some embodiments, the second lateral stabilizer 465 is positioned above and along the length of the lateral member 420. The second lateral stabilizer 465 is defined to similar to the lateral stabilizer 410. The second lateral stabilizer 465 may be configured to provide additional support on the lateral member 420. The second lateral stabilizer 465 may be selectively repositionable between the extended position and the retracted position, such that the lift arm assembly 200 is not able to vertically sway when the second lateral stabilizer 465 is in the retracted position. In the retracted position, the second lateral stabilizer 465 is selectively coupled to the lateral member 420.

Figure 10:
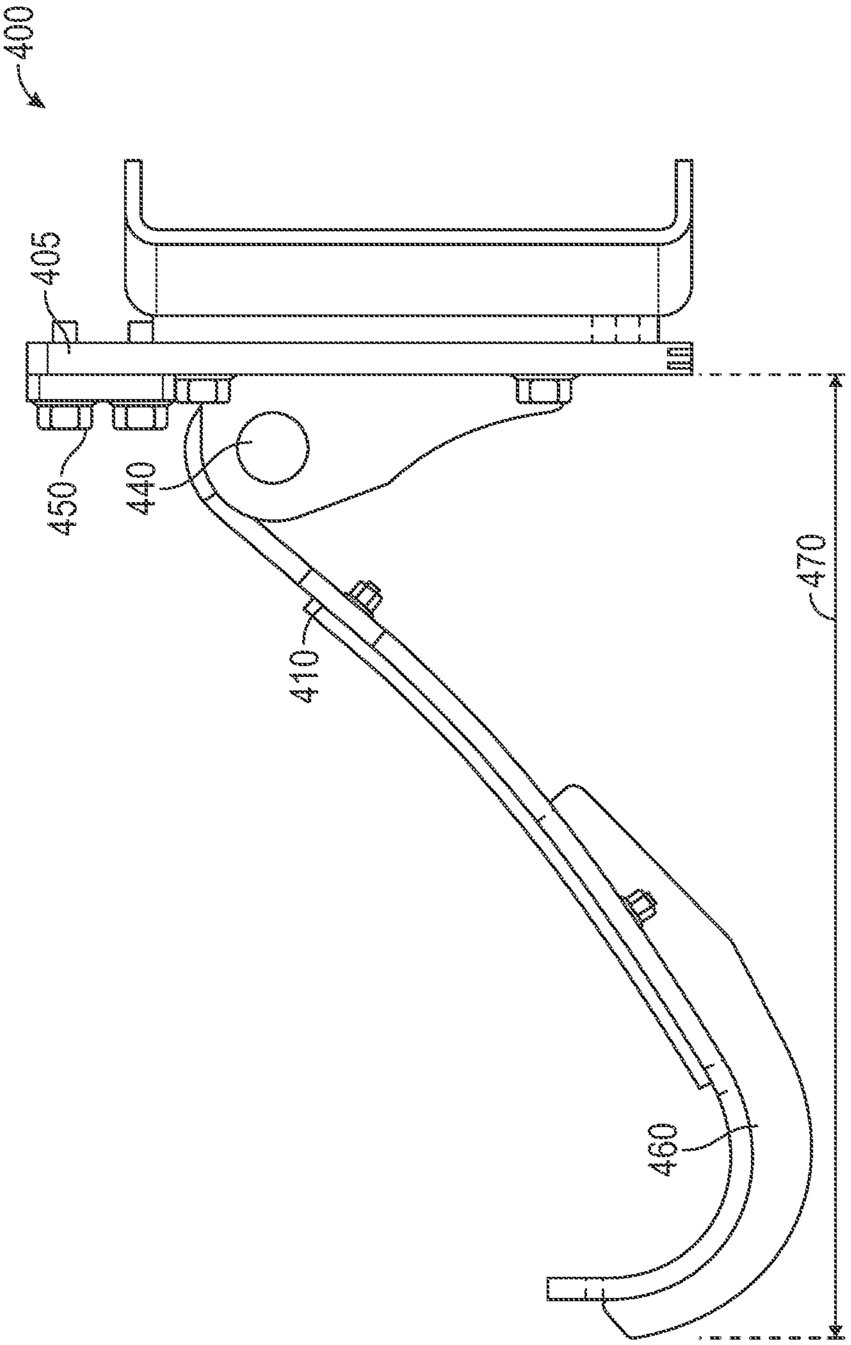
FIG. 10 is a side view of the lateral stabilizer of FIG. 8, shown in an extended position, according to an exemplary embodiment.
Figure 11:
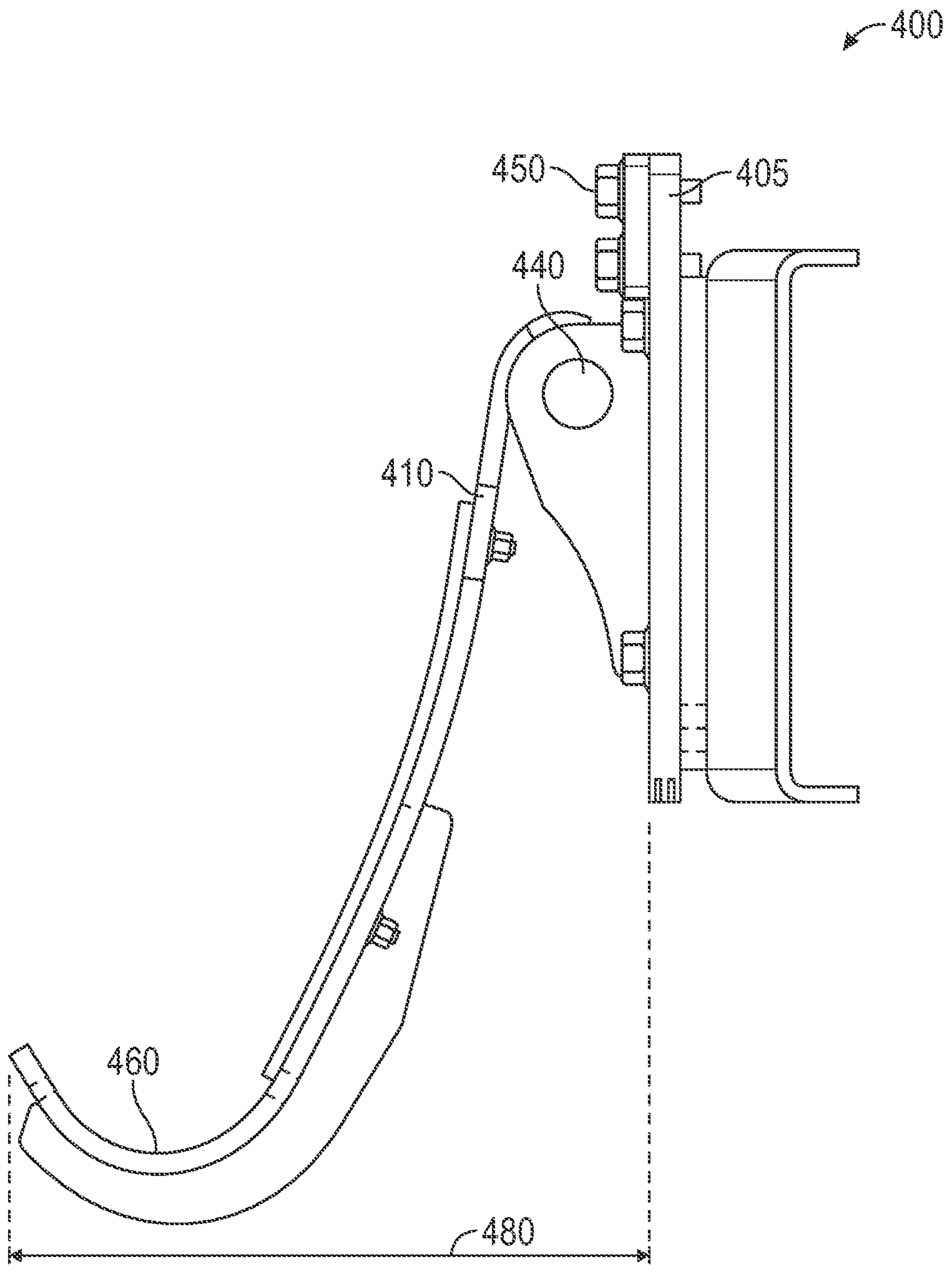
FIG. 11 is a side view of the lateral stabilizer of FIG. 8, shown in a retracted position, according to an exemplary embodiment.

Referring to FIGS. 10 and 11, a side view of the lateral stabilizer 410 is shown in the extended position and the retracted position, respectively. As shown in FIG. 10, the lateral stabilizer 410 is in an extended position. In the extended position, the lateral stabilizer 410 is defined to be a first distance 470 from the backer plate 405. When the lateral stabilizer 410 is in the retracted position, the lateral stabilizer is defined to be a second distance 480 from the backer plate 405, where the first distance 470 is greater than the second distance 480. In some embodiments, the lateral stabilizer 410 is fixed, thus the first distance 470 is equal to the second distance 480. In some embodiments, the first distance 470 is defined to be less than the second distance 480. In some embodiments, the first distance 470 may be equal to the second distance 480 (e.g., the lateral stabilizer 410 is fixed). As shown, the down stop 460 is positioned closer to a ground surface (e.g., road, surface, etc.) when the lateral stabilizer 410 is in the retracted position than when the lateral stabilizer 410 is in the extended position. In some embodiments, the down stop 460 is positioned closer to the ground surface when the lateral stabilizer 410 is in the extended position.

Figure 12:
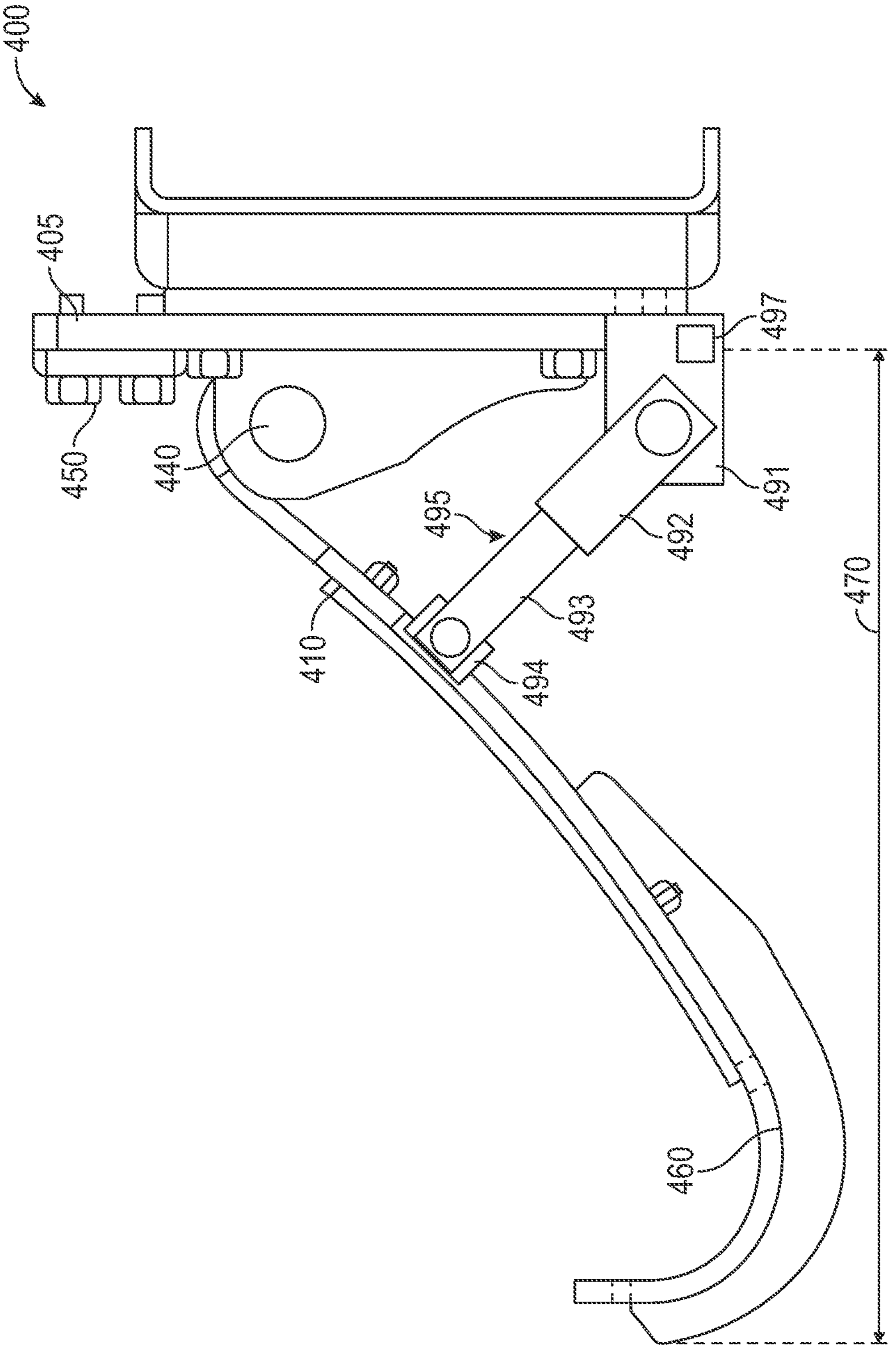
FIG. 12 is a side view of the lateral stabilizer of FIG. 8, shown in a retracted position with an actuator assembly, according to an exemplary embodiment.
Figure 13:
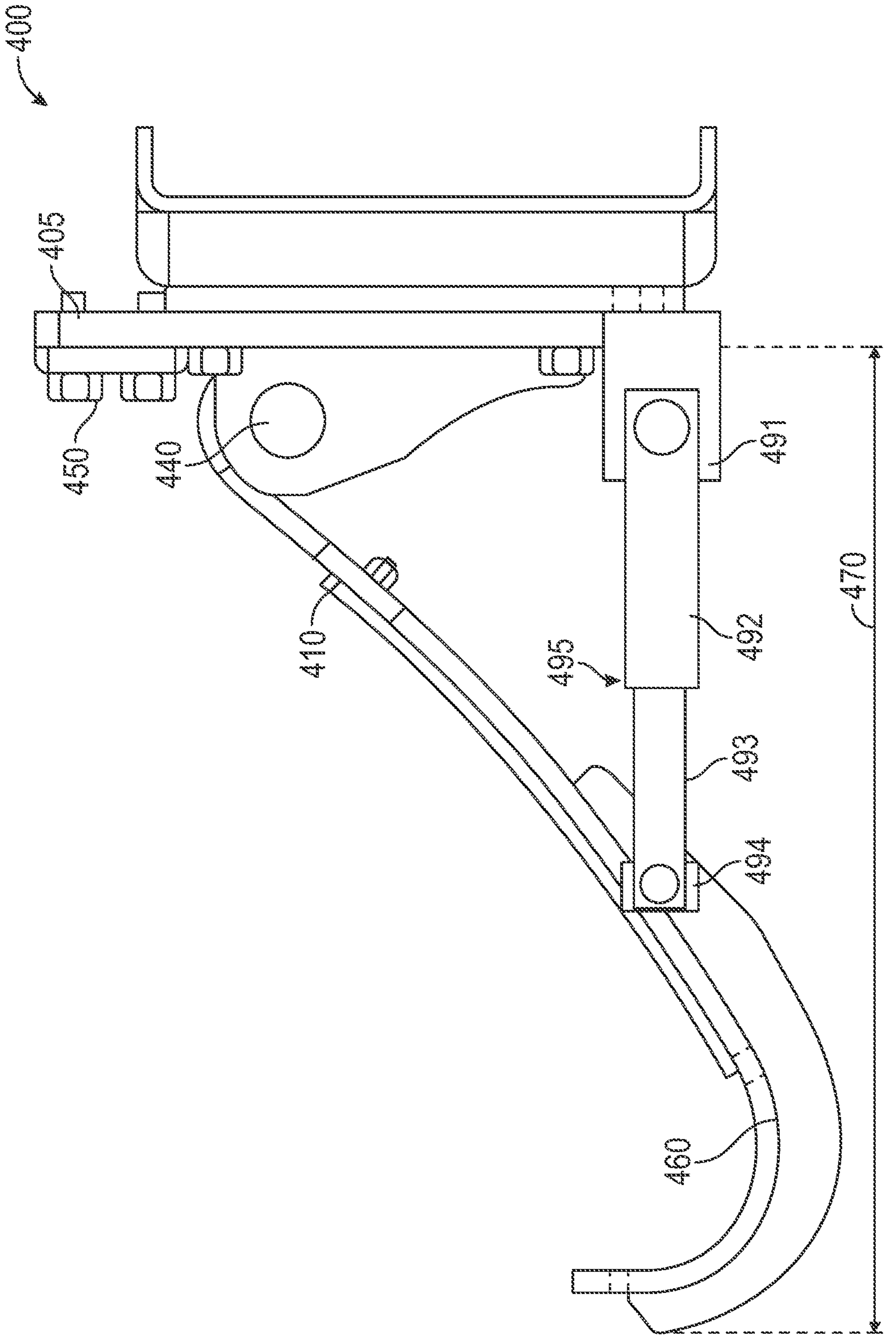
FIG. 13 is a side view of the lateral stabilizer of FIG. 8, shown in a retracted position with an actuator assembly, according to an exemplary embodiment.
Figure 14:
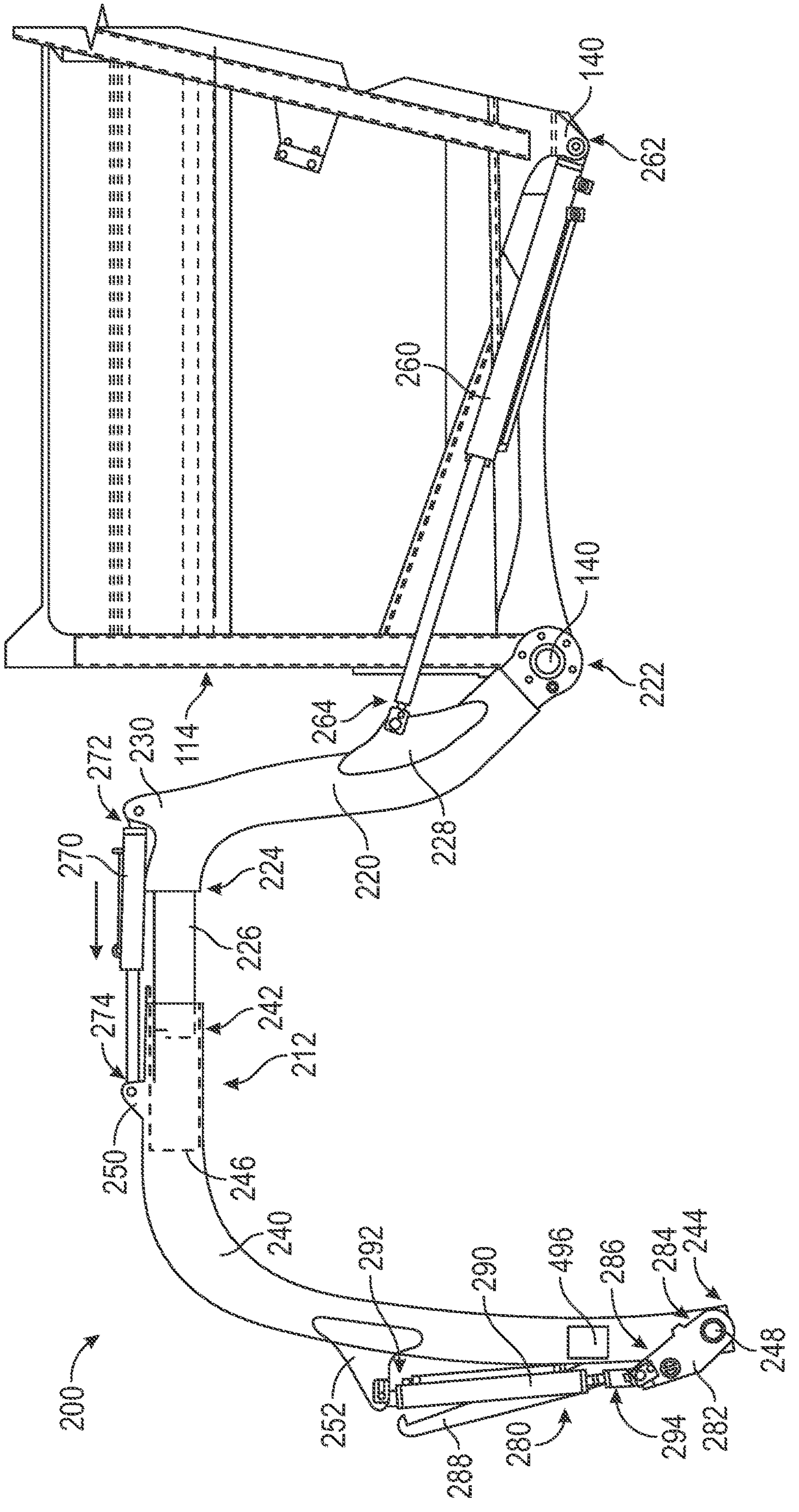
FIG. 14 is a side view of the lift arm assembly of FIG. 2 in a working position showing a sensor assembly, according to an exemplary embodiment.

Referring to FIGS. 12 and 13, a side view of the lateral stabilizer 410 is shown in the extended position with an actuator assembly 495 (e.g., a linear actuator), according to some embodiments. As shown, the actuator assembly 495 includes a bracket 491 coupled to the backer plate 405, a first actuator end 492 rotatably coupled to the bracket 491, a first actuator end 492, a second actuator end 493 disposed within the first actuator end 492 and configured to be extended or retracted relative to the first actuator end 402, and a bracket 494 fixedly coupled to the lateral stabilizer 410 and rotatably coupled to the second actuator end 493. The actuator assembly 495 may be hydraulically or electrically actuated and may be controlled via a controller 497. The controller 497 may include a processor and a memory storing instructions that, when executed by the processor, cause the controller to receive sensor data (e.g., measurements) from a sensor assembly, such as a sensor assembly 496 shown in FIG. 14. The sensor assembly 496 may include a position sensor configured to detect the position of the lateral member 420 (e.g., the height of the lateral member above the lateral stabilizer. While shown coupled to a lower portion of the backer plate 405, the bracket 491 may be positioned further upwards on the refuse vehicle 100 (e.g., above the lateral member 420). In some embodiments, the lift stabilizer 410 may be configured as a linear slide member, and the actuator assembly 495 may be configured to extend a flat pad horizontally to support the lateral member 420, as shown in FIG. 14. Although shown as a single actuator assembly 495, two actuator assemblies 495 may be used to control two lift stabilizers 410, as depicted with reference to FIG. 9.

The backer plate 405 may be coupled to the chassis 112 of the refuse vehicle 100. For example, the backer plate 405 may be coupled to a front bumper or front end of the refuse vehicle 100. The lateral stabilizer 410 may be rotatably coupled to the backer plate about a first axis 445. For example, a pin may extend through a bracket on the backer plate 405 and through a bracket on the lateral stabilizer 410, and the lateral stabilizer 410 may rotate about the pin. The lateral stabilizer 410 may be configured to receive the lateral member 420 of the lift assembly 200 as the lift assembly 200 moves from a second position in which the lift assembly is raised to deposit refuse into the hopper volume of the body 114 to a first position in which the lift assembly 200 is configured to couple to a refuse container 300 (e.g., a refuse container positioned in front of the refuse vehicle 100). The actuator 495 may be configured to adjust the position of the lateral stabilizer 410, for example, by rotating the lateral stabilizer 410 about the axis 445. The axis 445 may be substantially parallel to the lateral member 420, such that extending the actuator 495 may cause the lateral stabilizer 410 to be lifted towards the lateral member 420. The controller 479 may be configured to receive the sensor data from the sensor assembly 496 and control the actuator to adjust the position of lateral stabilizer based on the sensor data. For example, as the lift assembly 200 is lowered from the second position toward the first position, the sensor may detect the height of the lateral member 420. The controller 479, based on the sensor data, may extend the actuator 495 to lift the lateral stabilizer 410 towards the lateral member 420 until the lateral stabilizer 410 contacts the lateral member 420. As the lift assembly 200 continues to lower, the controller 497 may retract the actuator 495 so that the lateral stabilizer 410 stays in contact with the lateral member 420 until the lift assembly 200 reaches the first position while not preventing the lift assembly from lowering into the first position. In some embodiments, the lateral stabilizer assembly 400 may provide some vertical support to the lateral member 420 such that the actuators of the lift assembly 200 (e.g., the actuators 260) do not have to fully support the lift assembly 200 as it lowers into the first position. The actuator 495 may then continue to hold the lateral stabilizer 410 in contact with the lateral member 420 while the lift assembly 200 is in the first position and is coupled to the refuse container 300. The lateral stabilizer assembly 400 may thus provide lateral stability to the lift assembly 200 as the lift assembly 200 approaches the first position in addition to when the lift assembly 200 is in the first position.

Once the refuse container 300 is attached to the lift assembly 200, the lift assembly 200 may move from the first position to the second position to deposit refuse in the hopper volume of the body 114. As the lift assembly 200 begins to be lifted out of the first position, the controller 497 may control the actuator 495 such that the lateral stabilizer 410 remains in contact with the lateral member 420. The actuator 495 may extend to lift the lateral stabilizer 410 to stay in contact with the lateral member 420 until the distal end of the lateral stabilizer 410 is substantially vertical (e.g., where the lateral stabilizer 410 has a curvilinear profile as shown in FIGS. 12 and 13), so that the lateral stabilizer 410 does not restrict the removal of the lateral member 420 as the lift assembly 200 moves from the first position to the second position. In some embodiments, the lateral stabilizer assembly 400 may provide some vertical force on the lateral member 420 such that the actuators of the lift assembly 200 (e.g., the actuators 260) do not have to provide all of the force to lift the lift assembly 200. Once the actuator 495 rotates the lateral stabilizer 410 to its maximum height, the lateral member 420 may lose contact with the lateral stabilizer 410 and continue to be lifted toward the second position. The actuator 495 may then retract to lower the lateral stabilizer 410 into a stowed position in which the lateral stabilizer 410 extends substantially downward, parallel to the backer plate 405. Alternatively, once the lateral member 420 is clear of the radius of the lateral stabilizer 410, the actuator 495 may extend even further to lift the lateral stabilizer 410 until the lateral stabilizer extends substantially upward, parallel to the backer plate 405.

When the lift assembly 200 is in the first position, the lateral stabilizer 410 may be positioned between and abutting two bump plates 430 that are part of or coupled to the lateral member 420. The lateral stabilizer 410 may restrict the lateral movement of the lateral member 420 relative to the chassis 112 by contacting the bump plates 430, thereby restricting the lateral movement of the lift assembly 200 and a refuse container 300 coupled to the lift assembly 200 relative to the chassis 112.

Referring to FIG. 14, the sensor assembly 496 discussed above with reference to FIGS. 12 and 13 is shown, according to some embodiments. The sensor assembly 496 may include a position sensor, a gyroscopic sensor, an accelerometer, or any other suitable sensor configured to measure conditions associated with the stability and/or position of the right lift arm 210, the left lift arm 212, the lateral member 420, and/or the lift assembly 200 generally during operation. For example, sensor data from the sensor assembly 496 may be used by a controller 497 to control the single actuator assembly 495 or the two actuator assemblies 495 (independently) in order to maintain stability of the left lift arm 212 and/or the right lift arm 210 during operation.

Figure 15:
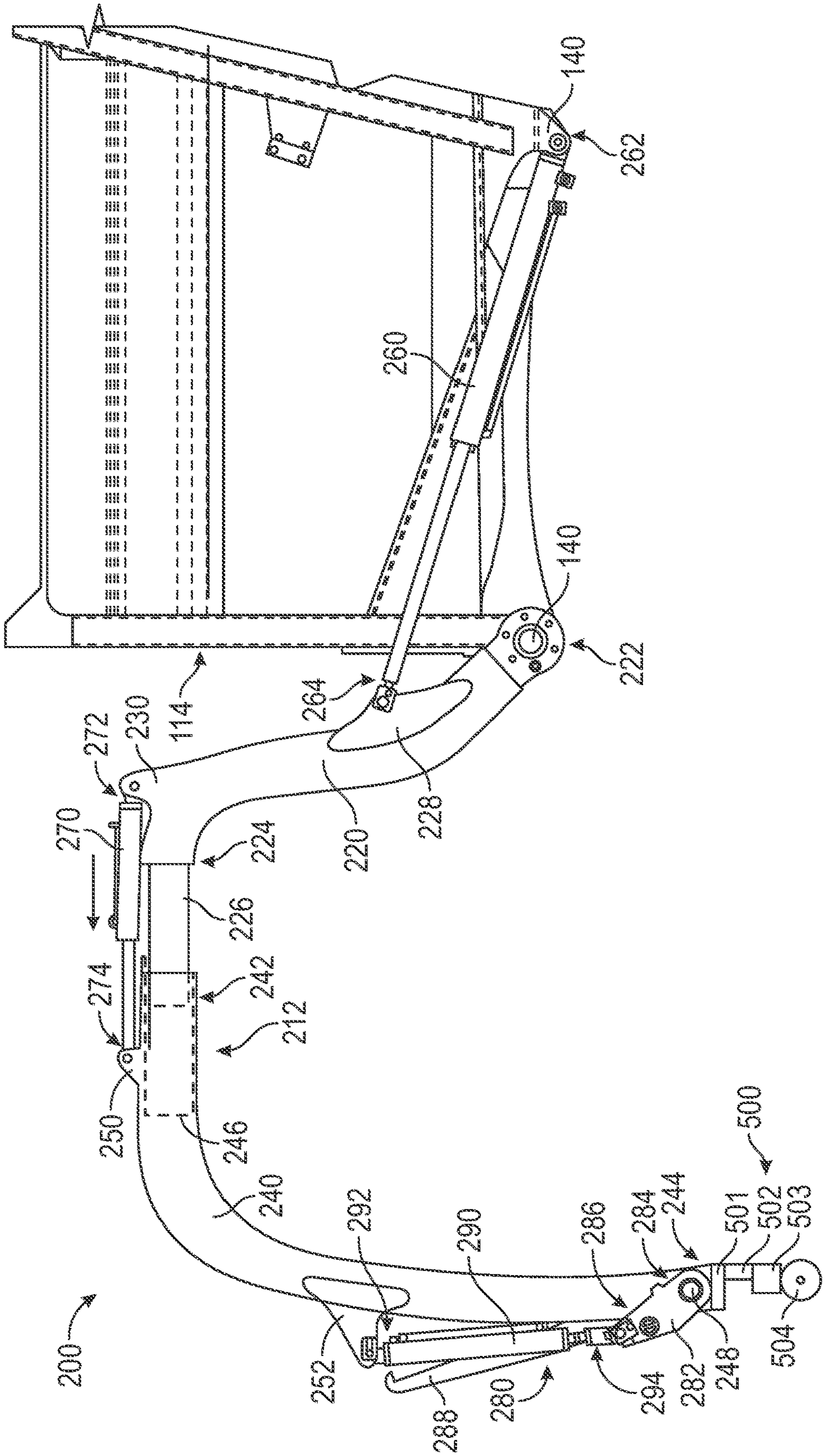
FIG. 15 is a side view of the lift arm assembly of FIG. 2 in a working position showing a caster support assembly, according to an exemplary embodiment.

Referring to FIG. 15, the lift assembly 200 is shown to include a caster assembly 500 coupled to the left lift arm 212. In some embodiments, a second caster assembly 500 may be coupled to the right lift arm 210. The caster assembly 500 includes a bracket 501 coupled to the second end 244, a hydraulic or electric actuator including a first end 502 and a second end 503, and a caster 504 (e.g., a wheel) coupled to the second end 503. The caster assembly 500, via the caster 504, may engage a road surface with the lift assembly 200 is lowered, in order to provide support and stability. The casters 504 may be oriented to rotate about axes substantially parallel with the wheels 120 of the refuse vehicle 100. Thus, the casters 504 may allow the lift assembly 200 to roll forward and back while restricting the lateral movement of the lift assembly 200. The hydraulic or electric actuator (the first end 502 and the second end 503) may define a dampener, a spring, or a cushion to provide upward support against the second end 244. In other embodiments, the hydraulic or electric actuator is controlled by a controller that receives measurements from the sensor assembly 496.

Figure 16:
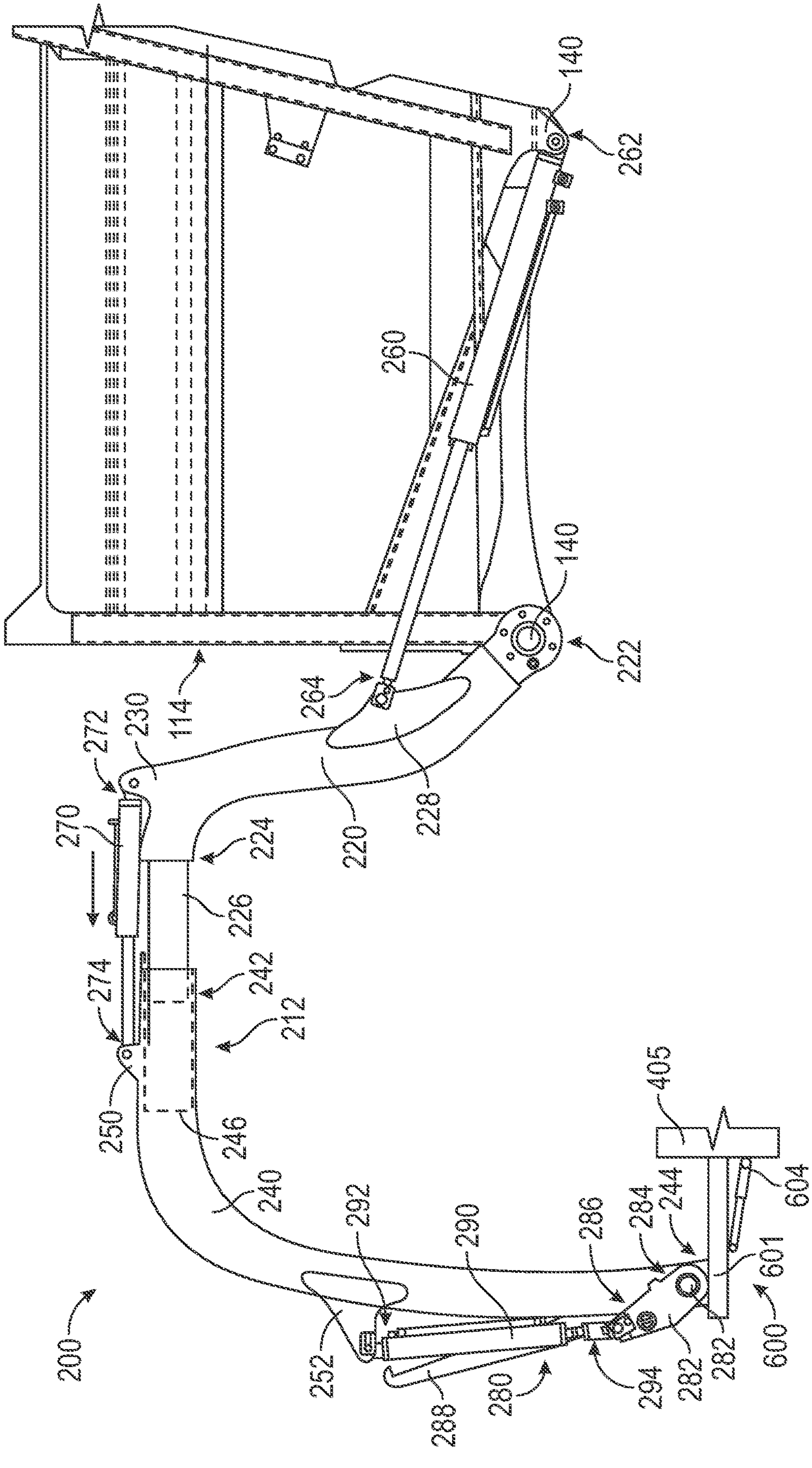
FIG. 16 is a side view of the lift arm assembly of FIG. 2 in a working position showing a pad assembly, according to an exemplary embodiment.
Figure 17:
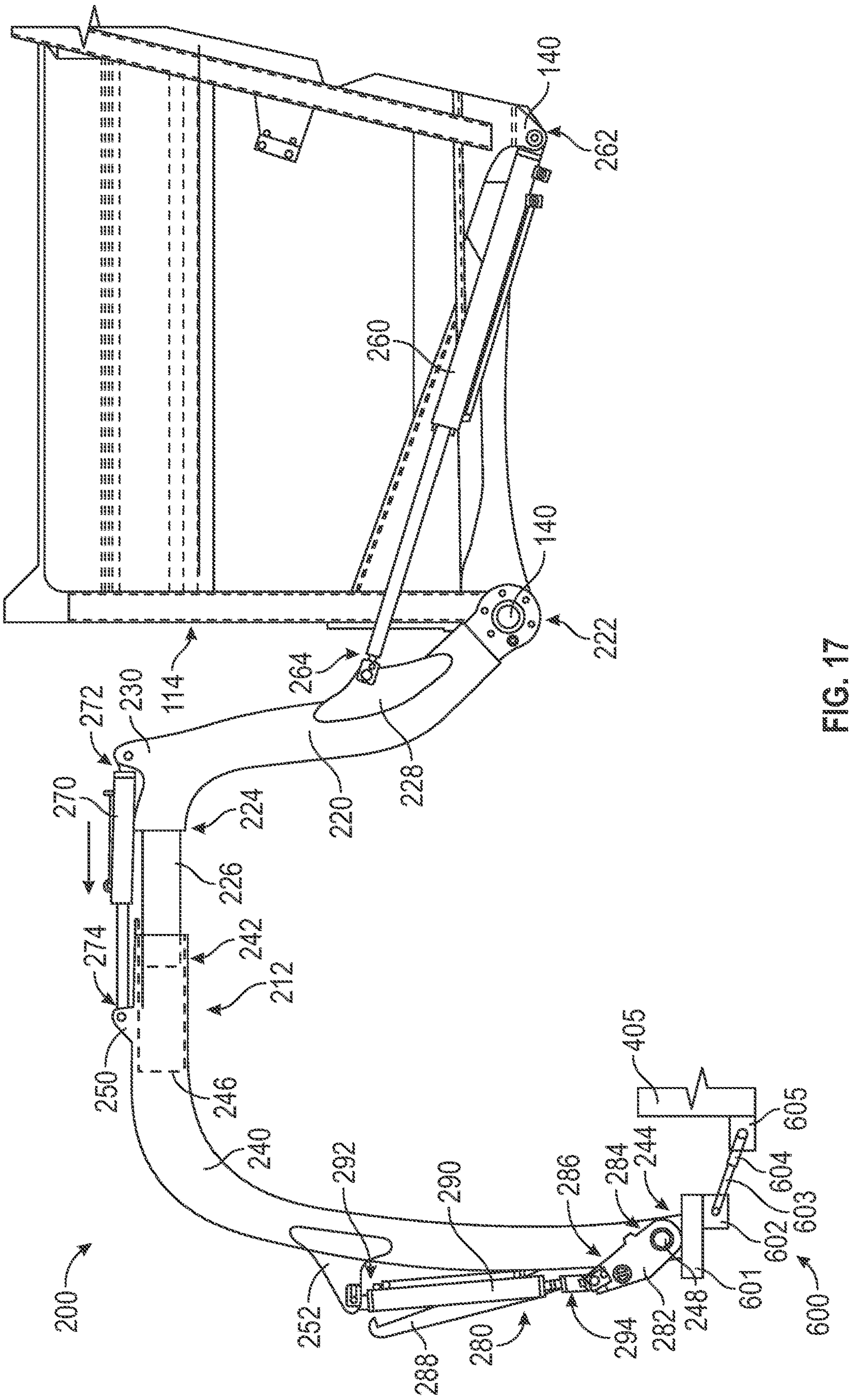
FIG. 17 is a side view of the lift arm assembly of FIG. 2 in a working position showing a pad assembly, according to an exemplary embodiment.

Referring to FIGS. 16 and 17, the lift assembly 200 is shown with a stabilizing pad assembly 600, according to some embodiments. As shown in FIG. 16, the stabilizing pad assembly 600 may include a pad 601 (e.g., a lateral stabilizer) coupled to the front bumper of the refuse vehicle 100. The pad 601 may allow the second end 244 to rest on the pad 601 when the lift assembly 200 is in the first position, thereby providing support and stability for the lift assembly 200. The pad 601 may be extended linearly from the vehicle 100 by an actuator 604, such as a linear actuator. The actuator 604 may be coupled to a backer plate 405 or may be positioned internal to the refuse vehicle 100 such that only the pad 601 extends from the vehicle 100. The actuator 604 may retract the pad 601 linearly into the refuse vehicle (e.g., through the backer plate 405) when the lift assembly 200 is not in the first position. The pad 601 may have a width similar to that of the lateral stabilizer 610 of FIGS. 12 and 13, such that the pad 601 may be positioned between and abut both of the bump plates 430.

As shown in FIG. 17, the pad assembly 600 may further include a hydraulic or electric actuator, shown as first end 602 and second end 603. The first end 602 may be rotatably coupled the pad 601 (e.g., a lateral stabilizer) and the second end 603 may be rotatably coupled to a bracket 605 that is coupled to the refuse vehicle 100. In this sense, the actuator (the first end 602 and the second end 603) may be controlled (via the controller receiving measurements from the sensor assembly 496) to engage the lower end 244 with the pad 601 when the lift assembly 200 is lowered or based on other stability measurements collected by the sensor assembly 496. The pad 601 may be a soft or low durometer material. In some embodiments, the pad 601 engages the lateral member 420 rather than the lower end 244, or other points along the left arm 212 or the right arm 210. In some embodiments, two pad assemblies 600 are used.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

The term “or,” as used herein, is used in its inclusive sense (and not in its exclusive sense) so that when used to connect a list of elements, the term “or” means one, some, or all of the elements in the list. Conjunctive language such as the phrase “at least one of X, Y, and Z,” unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the refuse vehicle 100 and the systems and components thereof as shown in the various exemplary embodiments is illustrative only. Additionally, any element disclosed in one embodiment may be incorporated or utilized with any other embodiment disclosed herein.

What is claimed is:

1. A refuse vehicle, comprising:
- a chassis;
- a body coupled to the chassis;
- a lift assembly coupled to at least one of the chassis or the body and selectively repositionable between a first position and a second position, the lift assembly comprising a lateral member extending between two lift arms;
- a lateral stabilizer assembly comprising:
  - a backer plate coupled to the chassis;
  - a lateral stabilizer coupled to the backer plate, the lateral stabilizer configured to receive the lateral member when the lift assembly is moved into the first position; and

- an actuator configured to adjust the position of the lateral stabilizer;
- a sensor configured to detect a position of the lateral member; and
- a controller communicably coupled to the sensor and the lateral stabilizer, the controller configured to:
  - receive sensor data from the sensor; and
  - control the actuator to adjust the position of the lateral stabilizer based on the sensor data.

2. The refuse vehicle of claim 1, wherein the actuator is configured to rotate the lateral stabilizer about a pivot axis, wherein the pivot axis is substantially parallel to a longitudinal axis of the lateral member.

3. The refuse vehicle of claim 2, wherein the actuator is a linear actuator coupled at a first end to the lateral stabilizer and at a second end to the backer plate.

4. The refuse vehicle of claim 1, wherein when the lift assembly is moved from the second position to the first position, controlling the actuator comprises extending the actuator to lift the lateral stabilizer until the lateral stabilizer receives the lateral member and retracting the actuator to lower the lateral stabilizer along with the lateral member until the lift assembly is in the first position.

5. The refuse vehicle of claim 1, wherein when the lift assembly is moved from the first position to the second position, controlling the actuator comprises extending the actuator to lift the lateral stabilizer along with the lateral member as the lift assembly is lifted out of the first position.

6. The refuse vehicle of claim 1, wherein the controller is further configured to retract the actuator to lower the lateral stabilizer after the lift assembly is moved out of the first position.

7. The refuse vehicle of claim 1, wherein the lateral member comprises two bump plates, wherein the lateral stabilizer is configured to abut the two bump plates when the lateral stabilizer receives the lateral member.

8. The refuse vehicle of claim 7, wherein when the lateral stabilizer is configured to restrict lateral movement of the lateral member by contacting the bump plates.

9. The refuse vehicle of claim 1, wherein the backer plate of the lateral stabilizer assembly is coupled to a front of the refuse vehicle, and the lift assembly is configured to couple to and lift a refuse container positioned in front of the refuse vehicle.

10. The refuse vehicle of claim 9, wherein the lateral stabilizer assembly is configured to restrict lateral movement of the lift assembly and the refuse container relative to the chassis.

11. The refuse vehicle of claim 1, wherein the lateral stabilizer is a flat stabilizing pad.

12. A refuse vehicle comprising:
- a chassis;
- a body coupled to the chassis;
- a lift assembly coupled to at least one of the chassis or the body and selectively repositionable between a first position and a second position, the lift assembly comprising a lateral member extending between two lift arms;
- a lateral stabilizer assembly coupled to at least one of the chassis, the body, or the lift assembly, the lateral stabilizer assembly comprising an actuator configured to adjust a position of a lateral stabilizer, the lateral stabilizer configured to restrict lateral movement of the lateral member when the lift assembly is in the first position;
- a sensor configured to detect a position of the lateral member; and a controller communicably coupled to the sensor, the controller configured to:

receive sensor data from the sensor; and control the actuator to adjust the position of the lateral stabilizer based on the sensor data.

13. The refuse vehicle of claim 12, wherein the actuator is configured to extend the lateral stabilizer linearly from the front of the refuse vehicle under the lateral member when the lift assembly is moving to the first position and to retract the lateral member towards the front of the vehicle when the lift assembly is away from the first position.

14. The refuse vehicle of claim 12, wherein the lateral stabilizer is a flat stabilizing pad.

15. The refuse vehicle of claim 12, wherein the actuator is configured to extend the lateral stabilizer toward a surface on which the refuse vehicle is positioned such that the lateral stabilizer contacts the surface.

16. The refuse vehicle of claim 15, wherein the lateral stabilizer is a wheel.

17. A lateral stabilizer assembly for a refuse container lift assembly of a refuse vehicle, the lateral stabilizer assembly comprising:

a backing plate configured to be coupled to a front of the refuse vehicle;

a lateral stabilizer rotatably coupled to the backing plate about an axis;

an actuator configured to rotate the lateral stabilizer about the axis;

a sensor configured to detect a position of the lift assembly; and a controller communicably coupled to the sensor, the controller configured to:

receive sensor data from the sensor; and control the actuator to adjust the position of the lateral stabilizer based on the sensor data.

18. The lateral stabilizer assembly of claim 17, wherein the lateral stabilizer comprises a curvilinear profile including a concave down stop configured to limit the extension of the lift assembly in a first direction.

19. The lateral stabilizer assembly of claim 18, wherein the actuator is a linear actuator rotatably coupled to the backing plate such that, as the actuator extends, the lateral stabilizer and the actuator each rotate relative to the backing plate.

* * * * *